(12) United States Patent
Masuda

(10) Patent No.: US 8,564,241 B2
(45) Date of Patent: Oct. 22, 2013

(54) BATTERY TEMPERATURE CONTROL SYSTEM

(75) Inventor: Eiji Masuda, Nagoya (JP)

(73) Assignee: Denso Corporation, Kariya (JP)

( * ) Notice: Subject to any disclaimer, the term of this patent is extended or adjusted under 35 U.S.C. 154(b) by 20 days.

(21) Appl. No.: 13/448,570

(22) Filed: Apr. 17, 2012

(65) Prior Publication Data

US 2012/0200263 A1   Aug. 9, 2012

Related U.S. Application Data

(62) Division of application No. 12/572,771, filed on Oct. 2, 2009.

(30) Foreign Application Priority Data

| Oct. 3, 2008 | (JP) | 2008-258345 |
| Oct. 6, 2008 | (JP) | 2008-259276 |
| Oct. 9, 2008 | (JP) | 2008-262623 |

(51) Int. Cl.
   *H02J 7/14* (2006.01)
(52) U.S. Cl.
   USPC .......................................... 320/104; 320/134
(58) Field of Classification Search
   USPC ................. 320/104, 130, 134, 136, 152, 153; 702/56, 142; 701/111
   See application file for complete search history.

(56) References Cited

U.S. PATENT DOCUMENTS

| 6,163,135 | A * | 12/2000 | Nakayama et al. ........... 320/150 |
| 6,408,968 | B1 * | 6/2002 | Wakashiro et al. ........ 180/65.26 |
| 7,888,811 | B2 | 2/2011 | Ichikawa et al. |
| 8,035,252 | B2 | 10/2011 | Ichikawa et al. |
| 2002/0003417 | A1 | 1/2002 | Bito et al. |
| 2008/0068775 | A1 | 3/2008 | Imamura et al. |
| 2008/0143281 | A1 | 6/2008 | Yaguchi |
| 2010/0026237 | A1 | 2/2010 | Ichikawa et al. |
| 2010/0085019 | A1 | 4/2010 | Matsuda |
| 2010/0102778 | A1 | 4/2010 | Otsu et al. |
| 2010/0156352 | A1 | 6/2010 | Muta et al. |

FOREIGN PATENT DOCUMENTS

| JP | P2003-274565 A | 9/2003 |
| JP | P2004-015866 A | 1/2004 |
| JP | P2005-020955 A | 1/2005 |

(Continued)

OTHER PUBLICATIONS

Jun. 22, 2012 Office Action from U.S. Appl. No. 12/572,771, 14 pages.

(Continued)

*Primary Examiner* — Edward Tso
*Assistant Examiner* — Aaron Piggush
(74) *Attorney, Agent, or Firm* — Nixon & Vanderhye PC

(57) ABSTRACT

A battery temperature control system, in temperature rise control, sets a maximum chargeable current and a maximum dischargeable current based on detection values of current, voltage, and temperature of a high-voltage battery, and controls charging/discharging power so that the current of the high-voltage battery does not exceed the maximum chargeable current or the maximum dischargeable current. For this reason, it is possible to prevent the high-voltage battery from abnormal heating and promptly raise its temperature according to change in the internal state of the high-voltage battery. In this control, a plurality of electrical equipment is selectively used. The amplitude of charging/discharging is controlled to reduce vibration noise and driving force fluctuation.

4 Claims, 19 Drawing Sheets

(56) References Cited

FOREIGN PATENT DOCUMENTS

| | | |
|---|---|---|
| JP | P2005-332777 A | 12/2005 |
| JP | P2006-174597 A | 6/2006 |
| JP | P2007-012568 A | 1/2007 |
| JP | P2007-028702 A | 2/2007 |
| JP | 2008-029171 | 2/2008 |
| JP | P2008-066503 A | 3/2008 |
| JP | 2008-125163 | 5/2008 |
| JP | P2008-162397 A | 7/2008 |
| WO | 2008/029564 | 3/2008 |

OTHER PUBLICATIONS

Japanese Office Action dated Jan. 25, 2012, issued in corresponding Japanese Application No. 2008-262623 with English Translation.

Office Action (2 pgs.) dated Jul. 24, 2012 issued in corresponding Japanese Application No. 2008-258345 with an at least partial English-language translation thereof (2 pgs.).

\* cited by examiner

FOURTH EMBODIMENT

SEVENTH EMBODIMENT

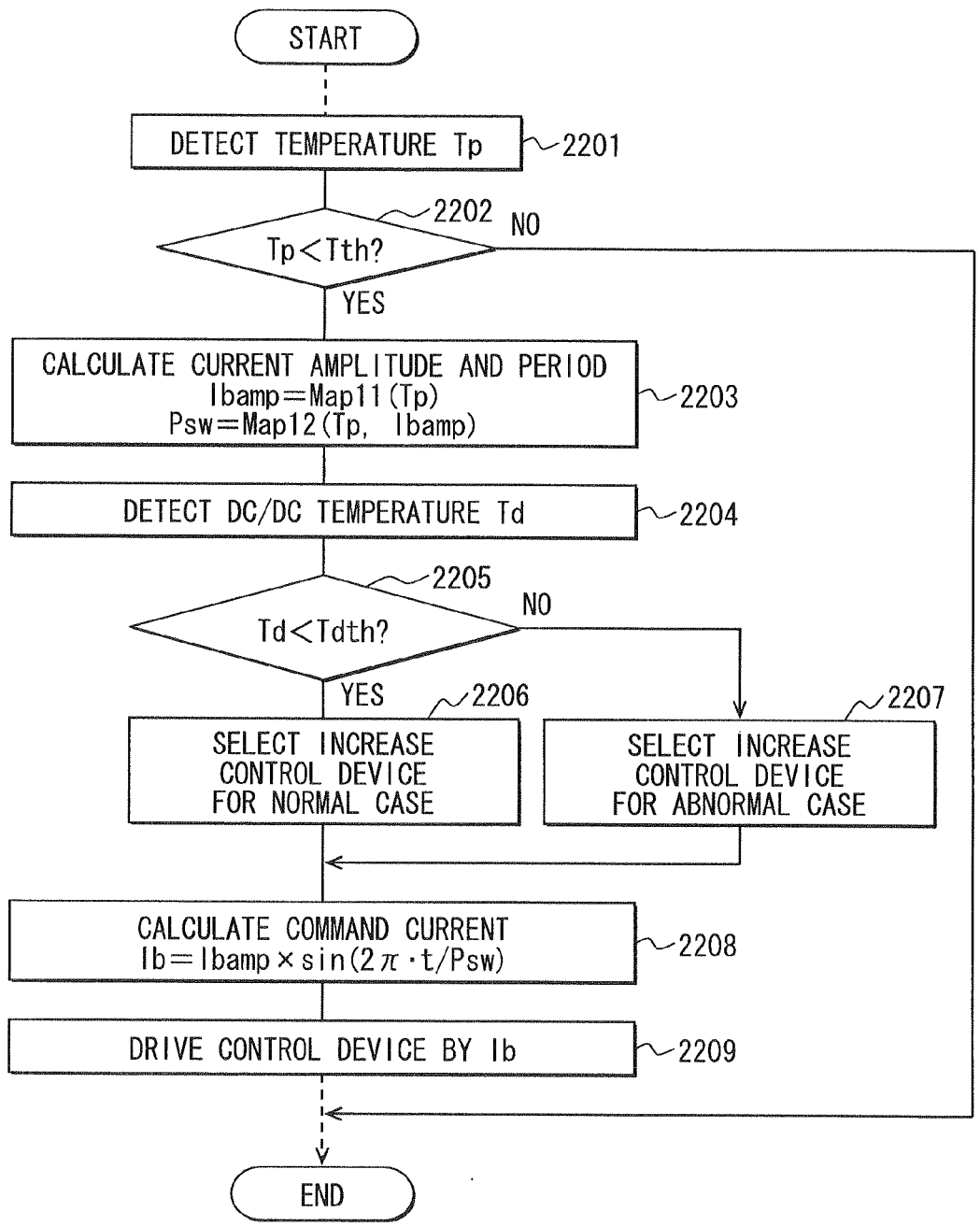

THIRTEENTH EMBODIMENT

BATTERY TEMPERATURE CONTROL SYSTEM

CROSS REFERENCE TO RELATED APPLICATIONS

This application is a Division of application Ser. No. 12/572,771, filed Oct. 2, 2009, which is in turn based on and claims priority to Japanese Patent Applications No. 2008-258345 filed on Oct. 3, 2008, No. 2008-259276 filed on Oct. 6, 2008, and No. 2008-262623 filed on Oct. 9, 2008, the entire contents of each of which are hereby incorporated by reference.

FIELD OF THE INVENTION

The present invention relates to a battery temperature control system that carries out the temperature rise control to raise the temperature of a battery mounted on a vehicle by its charging/discharging.

BACKGROUND OF THE INVENTION

In general, a battery (secondary battery) is reduced in its internal activation level at low temperature than at normal temperature and its internal resistance is increased. For this reason, even though the current is identical when the battery is discharged, the voltage between both ends is significantly reduced by the internal resistance. Battery performance is limited by the voltage between both ends. Therefore, the continuously dischargeable duration is shortened with reduction in the battery temperature and the amount of power that can be supplied from the battery is reduced. As for charging, the voltage between both ends is more steeply raised with reduction in the battery temperature and the continuously chargeable duration is shortened.

To cope with this, in recent years, to forcibly raise the temperature of a battery when the battery is at low temperature to promptly ensure its charge/discharge performance, charging/discharging of the battery is forcibly carried out to accelerate the production of Joule heat within the battery and the temperature of the battery is thereby internally raised.

In JP2001-314039A (US2002/003417), for example, battery temperature is detected by a temperature sensor and a remaining capacity control center value (SOC target value) of the battery is set according to this battery temperature. When the battery temperature is low, the remaining capacity control center value is shifted to the upper side of a remaining capacity control range. Then charging/discharging of the battery is controlled based on the deviation between this remaining capacity control center value and the actual remaining capacity (SOC). The production of Joule heat within the battery is thereby accelerated to raise the temperature of the battery.

As the charging/discharging current of a battery is increased, its Joule heating is increased and its temperature can be more quickly raised. In the above technique, however, charging/discharging power is controlled according to the temperature and remaining capacity of a battery. Therefore, when the internal state of the battery (for example, the internal resistance, the state of internal polarization, and the like) changes, it is likely that the charging/discharging power of the battery may go out of an appropriate range. In the temperature rise control, as a result, the charging/discharging power of the battery is excessively limited and this results in delayed temperature rise in the battery. Conversely, it is also likely that excessive charging/discharging power is passed and the battery abnormally produces heat and this leads to deterioration or breakage of the battery.

In JP 2007-28702A and JP 2007-12568A, the production of Joule heat within a battery is accelerated to raise the temperature of the battery by repeating charging and discharging of the battery alternately and periodically when the battery temperature detected by a temperature sensor is low.

When either charging or discharging of a battery is only continuously carried out for a long time, the polarizing effect of the battery is increased and significant voltage change occurs. As a countermeasure therefor, it is effective to alternately and periodically repeat charging and discharging during the execution of the temperature rise control. However, the cycle of switching between charging and discharging and the current amplitude (power amplitude) for achieving optimum temperature rise vary depending on the internal state of the battery that varies from hour to hour. Such internal state of a battery includes not only remaining capacity and battery temperature but also internal resistance, production tolerance, deterioration, and the like. Therefore, it is preferable to vary the cycle period and the amplitude according to the internal state of a high-voltage battery with respect to the cycle period and amplitude of charging/discharging for bringing out the maximum temperature rise performance. However, the cycle period or amplitude of charging/discharging for achieving optimum temperature rise may be difficult to implement depending on the type of electrical equipment used for the temperature rise control. For example, when the cycle period of charging/discharging is too short to meet the performance limit of the electrical equipment or the amplitude is too large to meet the performance limit of the electrical equipment, the following takes place: the current of the electrical equipment exceeds an allowable current; therefore, there is a possibility that the optimum cycle period or amplitude cannot be achieved. As a result, the performance of the temperature rise control is degraded and temperature rise in the battery is decelerated.

Further, when a boost converter is used to repeat periodical charging/discharging, the following takes place: input/output current to a capacitor of the boost converter is produced and vibration noise is produced in the capacitor. In JP 2008-78167A (US 2008/0068775), a cushioning material layer for absorbing vibration is added to the interior of a capacitor to reduce this vibration noise. In JP 2008-66503A, the electrode plane of a capacitor is formed of resin material low in coefficient of elasticity by molding.

In JP 2008-162397A, in a hybrid vehicle in which the driving force of a motor is transmitted through a gear box, when gear rattle in a gear is caused by fluctuation in the driving force of the motor, engine output correction or the like is carried out.

According to these conventional technologies, however, the following occurrence is expected depending on the cycle period or amplitude of battery charging/discharging in the temperature rise control: the effect of reducing noise such as vibration noise may be insufficient or the effect of reducing fluctuation in driving force may be insufficient.

SUMMARY OF THE INVENTION

It is a first object of the invention to prevent a battery from abnormal heating in the temperature rise control even when the internal state of the battery changes and to promptly raise the temperature of the battery.

It is a second object of the invention to enhance the performance of the temperature rise control by selection from among multiple pieces of electrical equipment capable of operating charging/discharging of a battery.

It is a third object of the invention to effectively reduce noise such as vibration noise and fluctuation in driving force that may occur during the execution of the temperature rise control.

To achieve the first object, in a temperature control system for a battery of the invention, a maximum chargeable current and a maximum dischargeable current are set based on the current, voltage, and temperature of a battery; and charging/discharging power is controlled to raise the temperature of the battery so that the current of the battery does not exceed the maximum chargeable current or the maximum dischargeable current. When the above the temperature rise control is carried out, based on the maximum chargeable current and the maximum dischargeable current, the switching period and/or amplitude of charging/discharging in the temperature rise control is set.

To achieve the second object, in a temperature control system for a battery of the invention, when the above the temperature rise control is carried out, based on at least one of the cycle period and amplitude of charging and/or discharging of a battery, electrical equipment that operates the charging and/or discharging of the battery is selected from among multiple pieces of electrical equipment.

To achieve the third object, in a temperature control system for a battery of the invention, during the execution of the temperature rise control, at least either the cycle period or amplitude of charging and/or discharging of a battery is limited so that vibration noise and/or driving force fluctuation is reduced.

BRIEF DESCRIPTION OF THE DRAWINGS

The above and other objects, features and advantages of the present invention will become more apparent from the following detailed description made with reference to the accompanying drawings. In the drawings:

FIG. 15 is a flowchart illustrating the processing in a the temperature rise control routine in a tenth embodiment;

DETAILED DESCRIPTION OF THE PREFERRED EMBODIMENT

Hereafter, the present invention will be described with reference to multiple embodiments, which are applied to an electric vehicle.

First Embodiment

Figure 1:
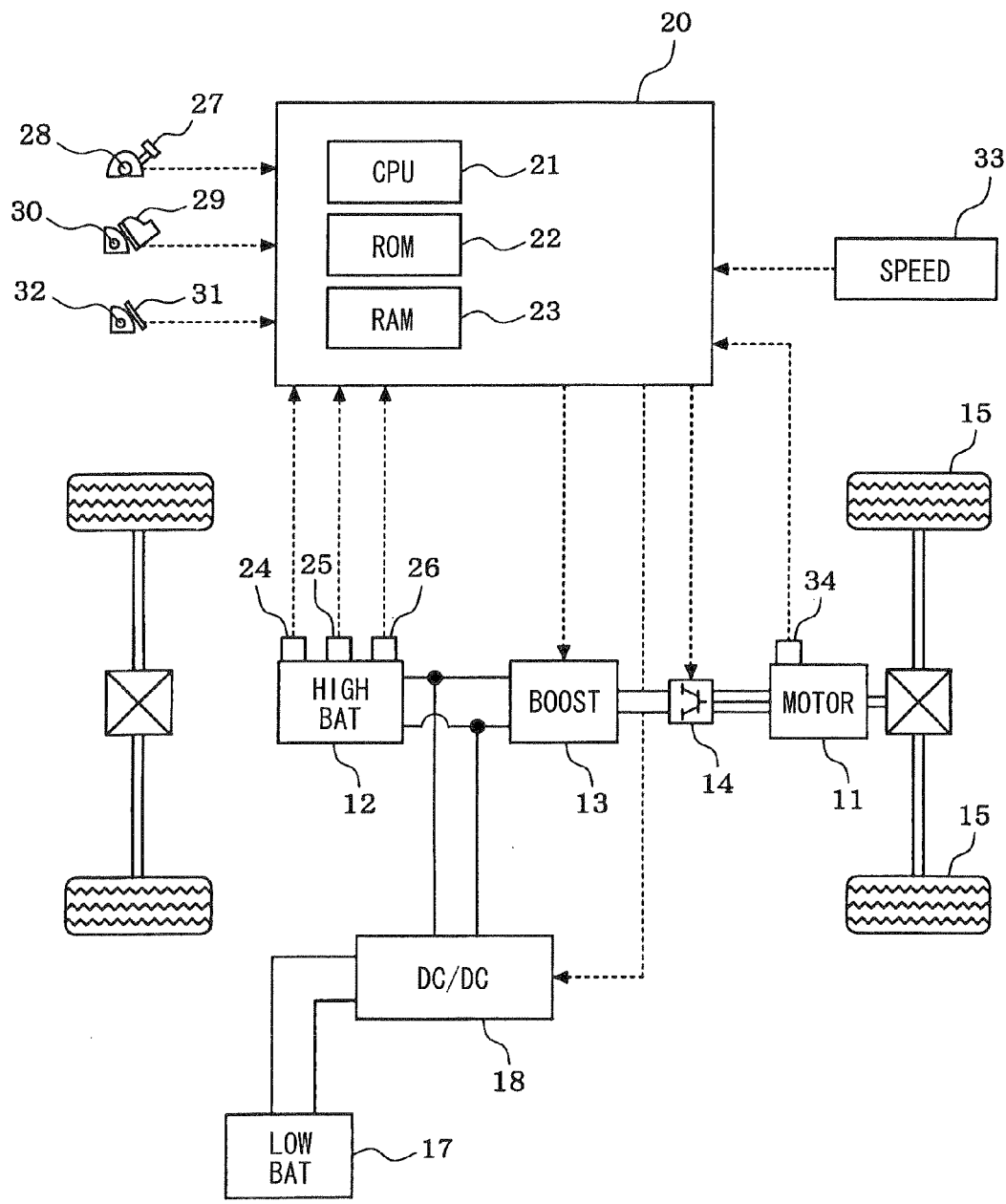
FIG. 1 is a schematic diagram illustrating the system of an electric vehicle in a first embodiment of the invention.

As illustrated in FIG. 1, an electric vehicle is mounted with: a motor 11 as a vehicle driving source; a high-voltage battery 12 as a power source for this motor 11; and a low-voltage battery 17 as a power source for various pieces of electrical equipment (electrical loads). The motor 11 is comprised of a synchronous generator motor as a motor also used as a generator. The high-voltage battery 12 is comprised of a secondary battery, such as a lithium (Li)-ion battery and a nickel-hydrogen battery, that outputs high voltage of, for example, 200 to 300V.

Between the motor 11 and the high-voltage battery 12, a boost converter 13 and an inverter 14 are provided. When the motor 11 is driven, a DC voltage outputted from the high-voltage battery 12 is stepped up at the boost converter 13 and converted into an AC voltage at the inverter 14 and then supplied to the motor 11. As a result, the motor 11 is rotated and the driving wheels 15 of the vehicle are driven. When the motor 11 generates power, the motor 11 is rotated by the torque of the driving wheels 15 and AC power is generated. Then this AC power is converted into DC power at the inverter 14 and stepped down at the boost converter 13 and the high-voltage battery 12 is charged therewith.

The low-voltage battery 17 is comprised of a secondary battery, such as a lead storage battery, that outputs DC voltage (for example, 12V) lower than the output voltage of the high-voltage battery 12. The low-voltage battery 17 is connected to the power supply line of the high-voltage battery 12 through a two-way DC-DC converter 18. When the low-voltage battery 17 is charged, the output voltage of the high-voltage battery 12 is stepped down at the two-way DC-DC converter 18 and the low-voltage battery 17 is charged therewith.

Meanwhile, a smoothing capacitor (not shown) of the boost converter 13 is precharged by stepping up the output voltage of the low-voltage battery 17 at the two-way DC-DC converter 18 and supplying it to the power supply line of the high-voltage battery 12 immediately after an ignition switch (not shown) is turned on. Alternatively, the temperature of the high-voltage battery 12 may be raised by carrying out charging and/or discharging of the high-voltage battery 12 by the step-up/down operation of the two-way DC-DC converter 18 between the high-voltage battery 12 and the low-voltage battery 17 during the execution of the temperature rise control described late.

The operation of the boost converter 13, inverter 14, and two-way DC-DC converter 18 is controlled by ECU (electronic control unit) 20. This ECU 20 is comprised of a microcomputer including a CPU 21 and includes, in addition to the CPU 21, ROM 22 for storing various programs and data, such as initial values, RAM 23 for temporarily storing varied data, and the like.

This ECU 20 is inputted with signals required for managing charging/discharging of the high-voltage battery 12. Examples of such signals include signals indicating: the charging/discharging current of the high-voltage battery 12 detected by a current sensor 24 (current detecting means); the voltage of the high-voltage battery 12 detected by a voltage sensor 25 (voltage detecting means); the temperature of the high-voltage battery 12 detected by a temperature sensor 26 (temperature detecting means); and the like. In addition, the following signals are inputted to the ECU 20: a shift position signal from a shift position sensor 28 for detecting the operating position of a shift lever 27; an accelerator position signal from an accelerator position sensor 30 for detecting the depression amount of an accelerator pedal 29; a brake pedal position signal from a brake pedal position sensor 32 for detecting the depression amount of a brake pedal 31; a vehicle speed signal from a vehicle speed sensor 33; a rotation angle signal from a rotation angle sensor 34 for detecting the rotation angle of the motor 11; and the like.

In the first embodiment configured as described above, the ECU 20 calculates a request torque based on the accelerator position signal from the accelerator position sensor 30, the vehicle speed signal from the vehicle speed sensor 33, and the like. Then it controls the operation of the motor 11 so that this request torque is provided.

Further, the ECU 20 executes the temperature rise control routine of FIG. 2, described below, and thereby carries out the temperature rise control when the temperature of the high-voltage battery 12 detected by the temperature sensor 26 is lower than a predetermined temperature. In this the temperature rise control, the temperature of the high-voltage battery 12 is raised by internal heating due to its charging/discharging. It is known that the Joule heat produced within the high-voltage battery 12 during the execution of this the temperature rise control is in proportion to the square of current. Therefore, temperature rise in the high-voltage battery 12 can be accelerated by passing larger current through the high-voltage battery 12 regardless of the direction of current passage (whether charge or discharge).

In the first embodiment, consequently, the following procedure is taken: the current, voltage, and temperature of the high-voltage battery 12 are sampled at predetermined time intervals to detect the present current, voltage, and temperature; and these three detection values are used to calculate the maximum dischargeable current Ibmax and the maximum chargeable current Ibmin that can be achieved under the battery conditions at the sampling time. Then the maximum dischargeable current Ibmax and the maximum chargeable current Ibmin are compared with each other and charging or discharging of the high-voltage battery 12 is determined so that a larger current can be passed. Thus the temperature rise control corresponding to the internal state of the high-voltage battery 12 can be implemented.

The present currents and voltages sampled at the predetermined time intervals are determined by the battery characteristics including even the influence of the polarized state, variation, age deterioration, and the like of the high-voltage battery 12. Therefore, the maximum chargeable/dischargeable current determined based on the present current and voltage determines the performance of the high-voltage battery 12 according to the state of the battery at the time when they were sampled. This makes it possible to accurately estimate the marginal performance of the high-voltage battery 12 even when the state of the high-voltage battery 12 changes. As a result, it is possible to prevent deterioration and breakage of the high-voltage battery 12 and to quickly raise the temperature of the high-voltage battery 12.

At the next sampling time, the actual current and voltage are detected again. Therefore, even though the state of the battery changes during a period between one sampling time and another, the degree of its influence can be corrected. That is, theoretically, the shorter a sampling cycle, the better the charging/discharging performance of the high-voltage battery 12 can be exerted even though the state of the battery suddenly changes.

In the first embodiment, the temperature rise control in the high-voltage battery 12 is carried out by the ECU 20 in accordance with the temperature rise control routine in FIG. 2 as described below. The temperature rise control routine in FIG. 2 is repeatedly carried out at predetermined time intervals during the on-period of the ignition switch (not shown).

When this routine is started, first, the following data is retrieved at step 101: the current (detected current) Ip of the high-voltage battery 12 detected by the current sensor 24; the voltage (detected voltage) Vp of the high-voltage battery 12 detected by the voltage sensor 25; and the temperature (detected temperature) Tp of the high-voltage battery 12 detected by the temperature sensor 26.

At step 102, thereafter, it is checked whether the temperature of the high-voltage battery 12 is within a the temperature rise control range based on whether the detected temperature Tp is lower than a predetermined temperature Tth. When the detected temperature Tp is equal to or higher than the predetermined temperature Tth, it is determined that the temperature rise control need not be carried out. Then the following processing is not carried out and this routine is terminated.

When it is determined at step 102 that the detected temperature Tp is lower than the predetermined temperature Tth, the processing of step 103 and the following steps in the temperature rise control is carried out as described below. At step 103, first, the maximum dischargeable current Ibmax and maximum chargeable current Ibmin are set using map data, a mathematical expression, or the like based on the detected current Ip, detected voltage Vp, and detected temperature Tp. The map or mathematical expression used in this processing can be set by determining the relation between the current, voltage, temperature of the high-voltage battery 12 and the maximum chargeable/dischargeable current (Ibmin, Ibmax) based on experimental data, design data, simulation, or the like and storing it as a map or a mathematical expression. In the first embodiment, charging current is expressed as a negative value and discharging current is expressed as a positive value. Step 103 functions as a maximum chargeable/dischargeable current setting means.

At step 104, thereafter, the absolute value of the maximum dischargeable current Ibmax and the absolute value of the maximum chargeable current Ibmin are compared with each other. When the absolute value of the maximum dischargeable current Ibmax is larger, the following processing is carried out at step 105: based on the maximum dischargeable current Ibmax and the detected temperature Tp, a command power Pb that attains maximum discharge is calculated by map data Map1. This map data Map1 can be set by determining the relation among the maximum dischargeable current Ibmax, the detected temperature Tp, and the command power Pb by experimental data, design data, simulation result, or the like and storing it as a map.

Meanwhile, when it is determined at step 104 that the absolute value of the maximum dischargeable current Ibmax is smaller than the absolute value of the maximum chargeable current Ibmin, the following processing is carried out at step 106: based on the maximum chargeable current Ibmin and the detected temperature Tp, a command power Pb that attains maximum charge is calculated by map data Map2. This map data Map2 can also be set beforehand based on experimental data, design data, simulation result, or the like.

At step 107, thereafter, an actuator (for example, the boost converter 13, inverter 14, motor 11, two-way DC-DC converter 18, or the like) is controlled according to the command power Pb set at step 105 or 106. Then the charging/discharging power of the high-voltage battery 12 is controlled so that it agrees with the command power Pb. The charging/discharging power is thereby controlled so that the current of the high-voltage battery 12 does not exceed the maximum chargeable current Ibmin or the maximum dischargeable current Ibmax and the temperature of the high-voltage battery 12 is raised by its internal heating. Steps 104 to 107 function as a the temperature rise controlling means.

According to the first embodiment, the following can be implemented in the temperature rise control: based on the current, voltage, and temperature of the high-voltage battery 12, the maximum chargeable current Ibmin and the maximum dischargeable current Ibmax are set; and the charging/discharging power is controlled so that the current of the high-voltage battery 12 does not exceed the maximum chargeable current Ibmin or the maximum dischargeable current Ibmax. When the internal state of the high-voltage battery 12 changes, it is possible to vary the maximum chargeable current Ibmin and the maximum dischargeable current Ibmax according to this change in the internal state of the high-voltage battery 12 and control the charging/discharging power. Even when the internal state of the high-voltage battery 12 changes, the charging/discharging power of the high-voltage battery 12 can be controlled to be within an appropriate range of the temperature rise control. As described above, it is possible to prevent the high-voltage battery 12 from abnormal heating and further promptly raise the temperature of the high-voltage battery 12.

Second Embodiment

Figure 3:
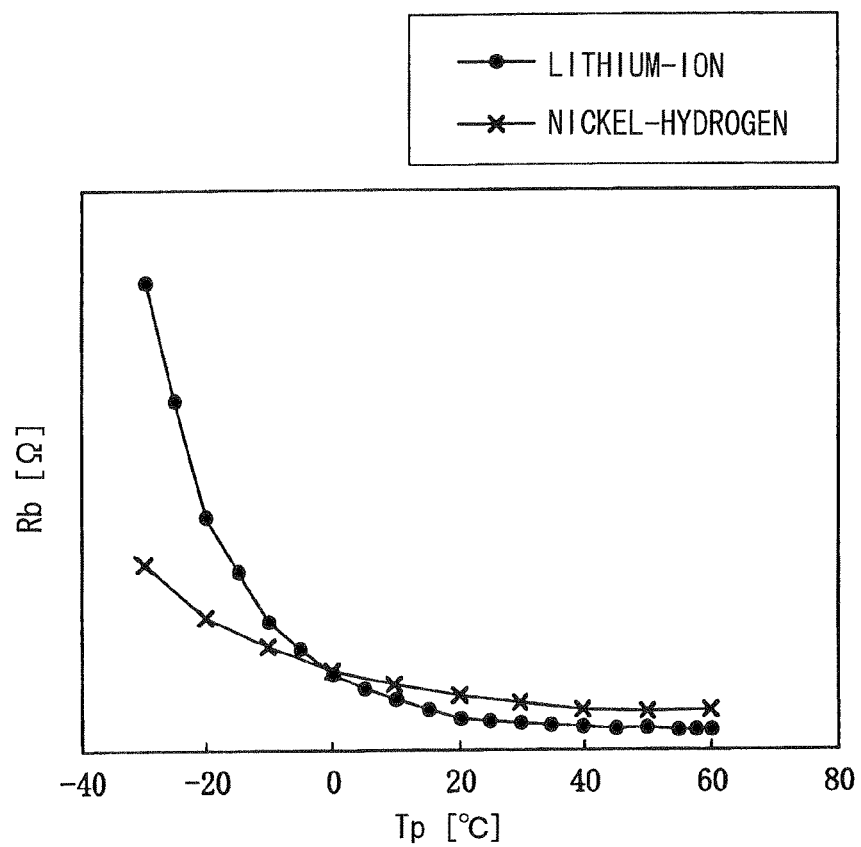
FIG. 3 is a graph indicating the relation between the temperature and internal resistance of a high-voltage battery.

In the first embodiment, the maximum chargeable current Ibmin and the maximum dischargeable current Ibmax in the temperature rise control are set by a map, a mathematical expression, or the like based on the current, voltage, and temperature of the high-voltage battery 12. As indicated in FIG. 3, however, the internal resistance of the high-voltage battery 12 is increased under cold condition. Therefore, it is preferable that the maximum chargeable current Ibmin and the maximum dischargeable current Ibmax in the temperature rise control should be determined based on use limitation on voltage in the high-voltage battery 12.

Figure 4:
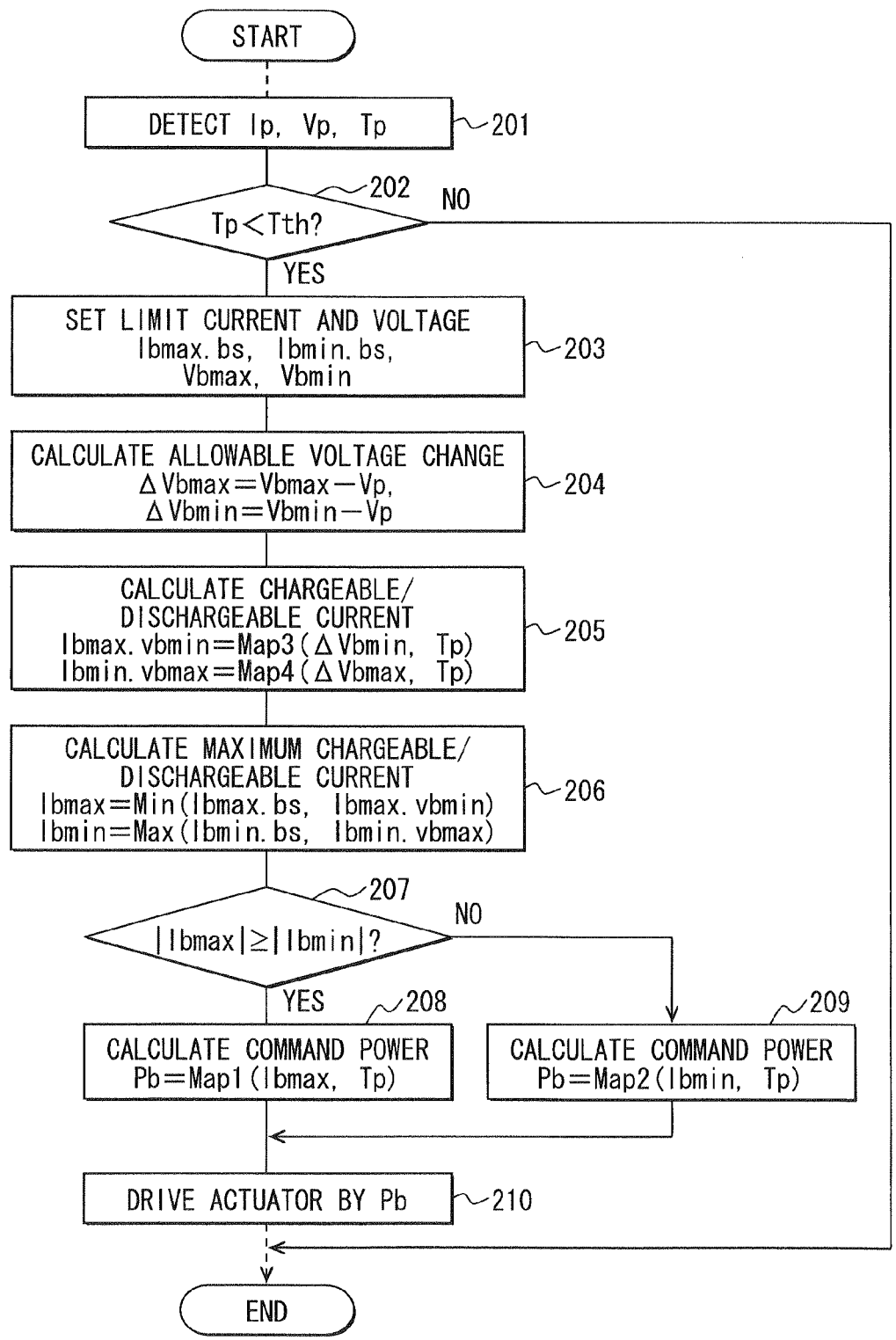
FIG. 4 is a flowchart illustrating the processing in a the temperature rise control routine in a second embodiment.
Figure 5:
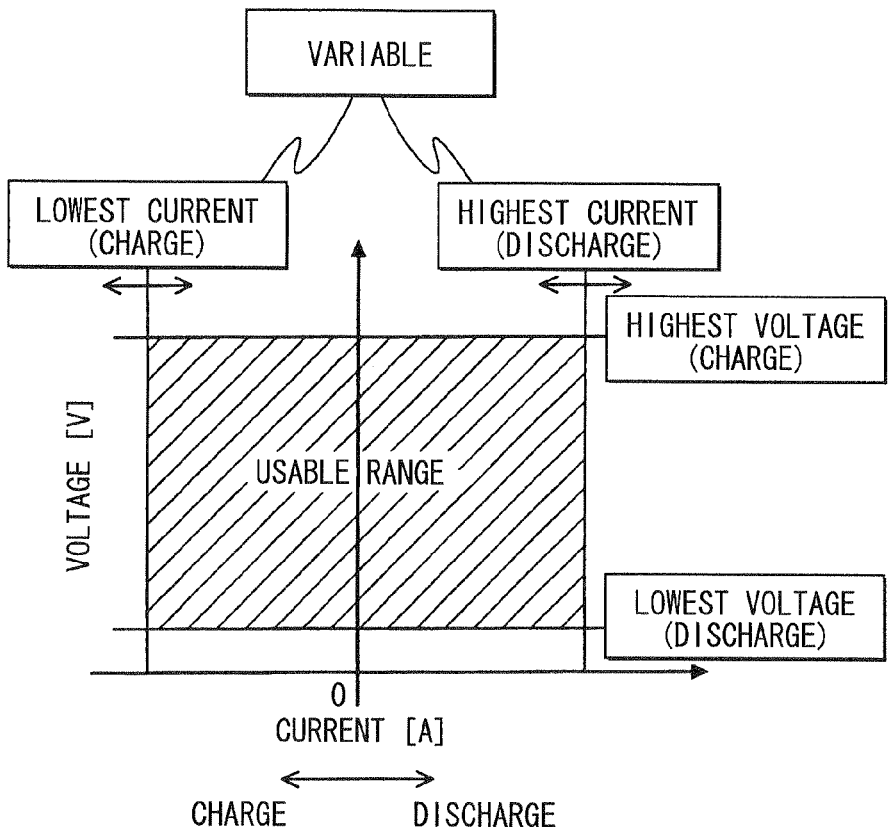
FIG. 5 is a graph indicating a use range with respect to the current and voltage of a high-voltage battery.

In the second embodiment illustrated in FIG. 4 and FIG. 5, consequently, to accurately set the maximum chargeable current Ibmin and the maximum dischargeable current Ibmax, the difference between the upper and lower limit values within the voltage use range (allowable range) of the high-voltage battery 12 illustrated in FIG. 5 and the sampled present voltage is determined, allowable voltage rise and drop to the upper and lower limit values within the voltage use range are calculated, and the maximum chargeable current Ibmin and the maximum dischargeable current Ibmax are set using the allowable voltage rise and drop, battery temperature that has influence on the internal resistance, and the upper and lower limit values within the current use range of the high-voltage battery 12.

When this routine is started in the second embodiment, the processing is carried out as described below. At step 201, first, the detected current Ip, detected voltage Vp, and detected temperature Tp detected by the respective sensors 24, 25, 26 are retrieved. At step 202, thereafter, it is checked whether the detected temperature Tp is lower than the predetermined temperature Tth. When the detected temperature Tp is equal to or higher than the predetermined temperature Tth, it is determined that the temperature rise control need not be carried out. Then the following processing is not carried out and this routine is terminated.

When it is determined at step 202 that the detected temperature Tp is lower than the predetermined temperature Tth, the processing of step 203 and the following steps in the temperature rise control is carried out as described below. At step 203, first, an upper limit current Ibmax.bs and low limit current Ibmin.bs within the current use range (Refer to FIG. 5) determined by the state of the battery are set. At the same time, an upper limit voltage Vbmax and a lower limit voltage Vbmin within the voltage use range (FIG. 5) determined by the characteristics of the battery are set. The current use range and the voltage use range can be set beforehand based on experimental data, design data, simulation result, or the like. Step 203 functions as a use range setting means.

At step 204, thereafter, the following processing is carried out: based on the upper and lower limit voltages (Vbmax, Vbmin) within the voltage use range and the present detected voltage Vp, an allowable voltage rise ΔVbmax and an allowable voltage drop ΔVbmin that are differences between them are calculated.

Allowable voltage rise: $\Delta Vbmax = Vbmax - Vp$

Allowable voltage drop: $\Delta Vbmin = Vbmin - Vp$

At step 205, thereafter, a dischargeable current Ibmax.vbmin and a chargeable current Ibmin.vbmax are calculated by maps (Map3, Map4) based on the allowable voltage rise and drop (ΔVbmax, ΔVbmin) and the detected temperature Tp.

[Dischargeable Current Ibmax.vbmin Determined from Allowable Voltage Drop ΔVbmin]

$Ibmax.vbmin = Map3(\Delta Vbmin, Tp)$

[Chargeable Current Ibmin.vbmax Determined from Allowable Voltage Rise ΔVbmax]

$Ibmin.vbmax = Map4(\Delta Vbmax, Tp)$

These maps (Map3, Map4) can also be set beforehand based on experimental data, design data, simulation result, or the like.

At step 206, thereafter, the upper limit current Ibmax.bs within the current use range and the dischargeable current Ibmax.vbmin are compared with each other. Then the lower one is selected as the maximum dischargeable current Ibmax. The lower limit current Ibmin.bs within the current use range and the chargeable current Ibmin.vbmax are compared with each other. Then the one lower in absolute value is selected as the maximum chargeable current Ibmin.

Maximum dischargeable current: $Ib\text{max}=\text{Min}(Ib\text{max}.bs, Ib\text{max}.vb\text{min})$ Maximum chargeable current: $Ib\text{min}=\text{Max}(Ib\text{min}.bs, Ib\text{min}.vb\text{max})$ The discharging current takes a positive value and the charging current takes a negative value. Thus the maximum dischargeable current Ibmax and the maximum chargeable current Ibmin are set so that they do not exceed the current use range.

At step 207, thereafter, the absolute value of the maximum dischargeable current Ibmax and the absolute value of the maximum chargeable current Ibmin are compared with each other. When the absolute value of the maximum dischargeable current Ibmax is larger, the following processing is carried out at step 208: based on the maximum dischargeable current Ibmax and the detected temperature Tp, the command power Pb that attains maximum discharge is calculated by the map data Map1. Meanwhile, when it is determined at step 207 that the absolute value of the maximum dischargeable current Ibmax is smaller than the absolute value of the maximum chargeable current Ibmin, the following processing is carried out at step 209: based on the maximum chargeable current Ibmin and the detected temperature Tp, the command power Pb that attains maximum charge is calculated by the map data Map2.

At step 210, thereafter, the actuator (the boost converter 13, inverter 14, motor 11, two-way DC-DC converter 18, or the like) is controlled according to the command power Pb set at step 208 or 209. Then the charging/discharging power of the high-voltage battery 12 is controlled so that the command power Pb is attained. The charging/discharging power is thereby controlled so that the current of the high-voltage battery 12 does not exceed the maximum chargeable current Ibmin or the maximum dischargeable current Ibmax and the temperature of the high-voltage battery 12 is raised.

In the second embodiment, the following processing is carried out: the differences between the upper and lower limit values within the voltage use range of the high-voltage battery 12 and the sampled present voltage is determined; allowable voltage rise and drop to the upper and lower limit values within the voltage use range are calculated from these differences; and the maximum chargeable current Ibmin and the maximum dischargeable current Ibmax are set using the above allowable voltage rise and drop, the temperature of the high-voltage battery 12 that has influence on its internal resistance, and the upper and lower limit values within the current use range of the high-voltage battery 12. This makes it possible to take the internal state of the high-voltage battery 12 into account in the temperature rise control and limit the charging/discharging power so that neither the current nor voltage of the high-voltage battery 12 exceeds the respective use range. Even when voltage changes, it is possible to efficiently accelerate temperature rise by the charging/discharging of the high-voltage battery 12 and prevent the high-voltage battery 12 from abnormal heating due to excessive charging/discharging current.

Third Embodiment

Figure 7:
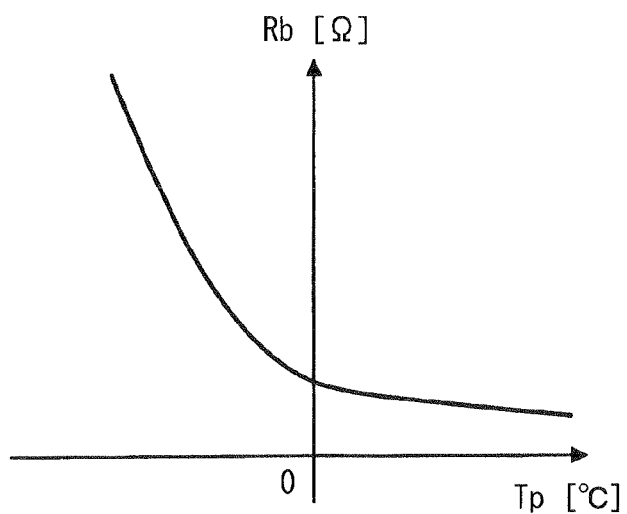
FIG. 7 is a graph illustrating an example of map data for calculating the internal resistance of a high-voltage battery using its detected temperature as a parameter.

In the second embodiment, to take into account the influence of the internal resistance of the high-voltage battery 12, the detected temperature Tp of the high-voltage battery 12 is used to set the maximum chargeable current Ibmin and the maximum dischargeable current Ibmax. In the third embodiment illustrated in FIG. 6 and FIG. 7, attention is directed to the relation that under cold condition, the internal resistance of the high-voltage battery 12 is increased with reduction in its temperature. Then the internal resistance Rb is estimated based on the detected temperature Tp of the high-voltage battery 12 and the estimated internal resistance Rb is used to set the maximum chargeable current Ibmin and the maximum dischargeable current Ibmax.

Figure 6:
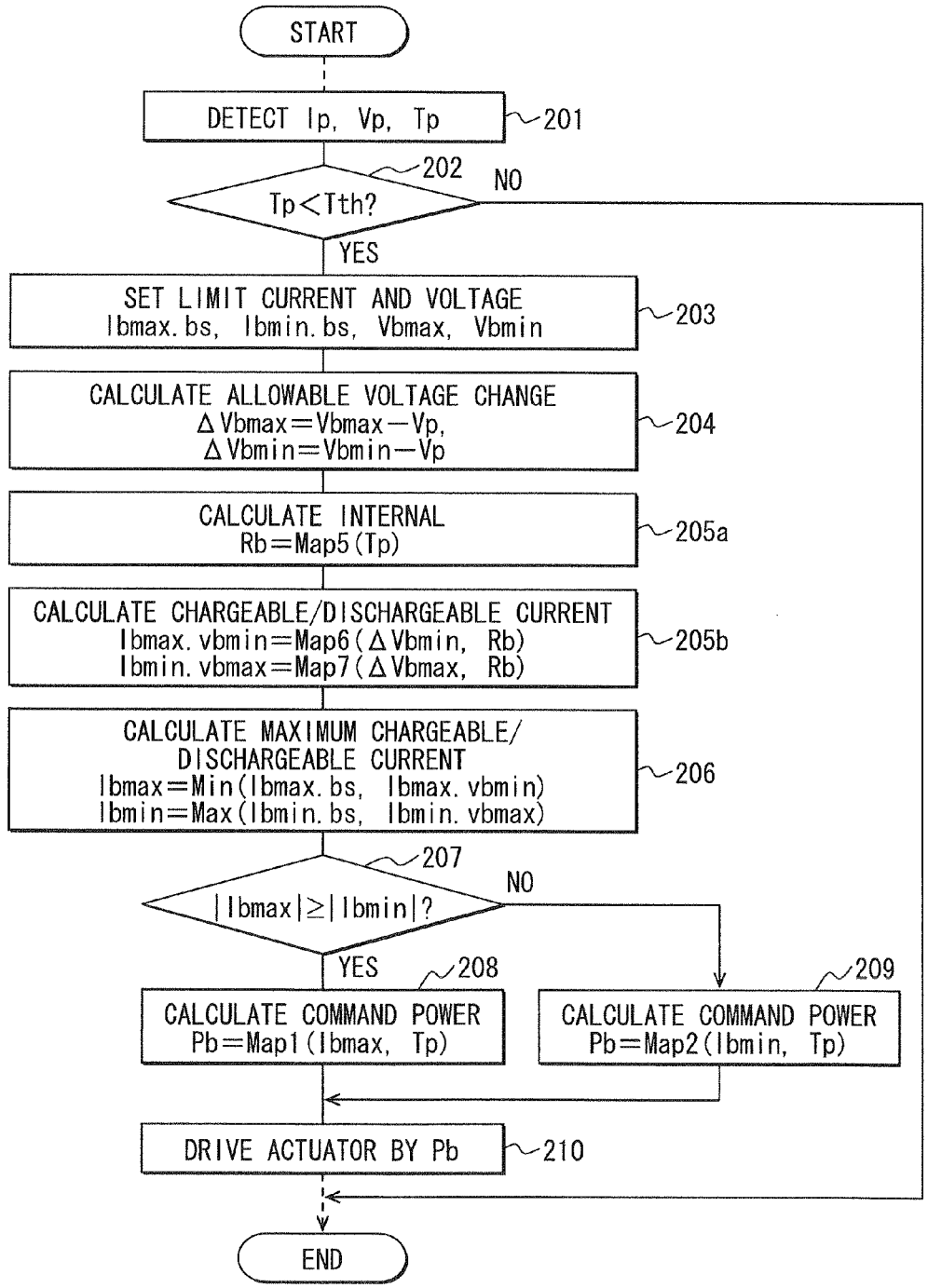
FIG. 6 is a flowchart illustrating the processing in a the temperature rise control routine in a third embodiment.

In the temperature rise control routine in the third embodiment illustrated in FIG. 6, the processing of step 205 in the temperature rise control routine in FIG. 4 is replaced with the processing of steps 205a and 205b. The processing of the other steps is the same as in the routine in FIG. 4.

In this routine, the allowable voltage rise ΔVbmax and the allowable voltage drop ΔVbmin are calculated from the differences between the upper and lower limit voltages (Vbmax, Vbmin) within the voltage use range and the present detected voltage Vp at step 204. At step 205a, thereafter, the internal resistance Rb corresponding to the present detected temperature Tp is calculated with reference to map data Map5 in FIG. 7. This map data is used to calculate the internal resistance Rb of the high-voltage battery 12 using its detected temperature Tp as a parameter.

$Rb=\text{Map5}(Tp)$

This map data Map5 may be set beforehand based on experimental data, design data, simulation result, or the like so that the internal resistance Rb is increased with reduction in the detected temperature Tp.

At step 205b, thereafter, the dischargeable current Ibmax.vbmin and the chargeable current Ibmin.vbmax are calculated from map data (Map6, Map7) based on the allowable voltage rise and drop (ΔVbmax, ΔVbmin) and the internal resistance Rb.

[Dischargeable Current Ibmax.vbmin Determined from Allowable Voltage Drop ΔVbmin]

$Ib\text{max}.vb\text{min}=\text{Map6}(\Delta Vb\text{min},Rb)$

[Chargeable Current Ibmin.vbmax Determined from Allowable Voltage Rise ΔVbmax]

$Ib\text{min}.vb\text{max}=\text{Map7}(\Delta Vb\text{max},Rb)$

These pieces of map data (Map6, Map7) are also set beforehand based on experimental data, design data, simulation result, or the like.

Thereafter, the processing of steps 206 to 210 is carried out and the maximum dischargeable current Ibmax and the maximum chargeable current Ibmin are set by the same method as in the second embodiment. The command power Pb that attains maximum charge/discharge is thereby calculated and the actuator is controlled to raise the temperature of the high-voltage battery 12.

In the third embodiment, the internal resistance Rb is estimated based on the detected temperature Tp of the high-voltage battery 12 and the estimated internal resistance Rb is used to set the maximum chargeable current Ibmin and the maximum dischargeable current Ibmax. Even when change in the internal resistance of the high-voltage battery 12 occurs, it is possible to accurately set the maximum chargeable current Ibmin and the maximum dischargeable current Ibmax and achieve quick temperature rise in the high-voltage battery 12.

Fourth Embodiment

During the execution of the temperature rise control, a driver may depress the accelerator pedal 29 to quickly accelerate or the brake pedal 31 to quickly decelerate. When the temperature rise control is continued in these cases, it is likely that the acceleration/deceleration performance is degraded and the driver's acceleration/deceleration request cannot be met.

Figure 8:
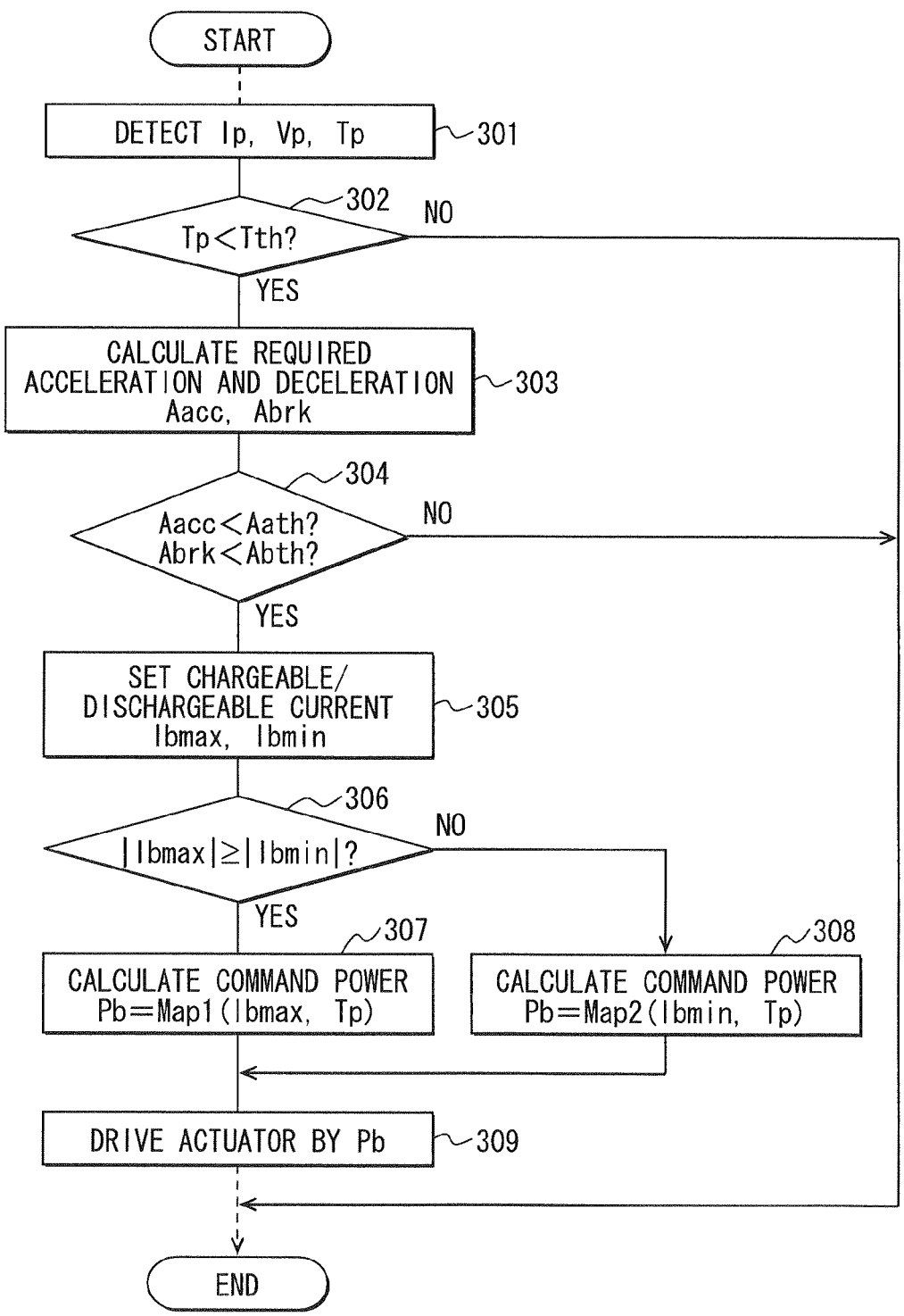
FIG. 8 is a flowchart illustrating the processing in a the temperature rise control routine in a fourth embodiment.

In the fourth embodiment illustrated in FIG. 8, consequently, the degree of the driver's acceleration/deceleration request (the driver's intention to drive) is determined from output signals from the accelerator position sensor 30 and the brake pedal position sensor 32. When the driver requests quick acceleration or quick deceleration beyond a predetermined range, the temperature rise control is prohibited and the charging/discharging power of the high-voltage battery 12 is controlled so as to meet the driver's acceleration/deceleration request.

In the fourth embodiment, the temperature rise control routine in FIG. 8 is repeatedly carried out at predetermined time intervals during the on-period of the ignition switch. The processing of steps 301, 302, and 305 to 309 in this routine is the same as the processing of steps 101 to 107 in the temperature rise control routine in FIG. 2 described in relation to the first embodiment. That is, in the temperature rise control routine in FIG. 8, processing of two steps, steps 303 and 304, are added between step 102 and step 103 in the temperature rise control routine in FIG. 2.

When the temperature rise control routine in FIG. 8 is started, the processing is carried out as described below. At step 301, the detected current Ip, detected voltage Vp, and detected temperature Tp detected by the respective sensors 24, 25, 26 are retrieved. When it is subsequently determined at step 302 that the detected temperature Tp is lower than the predetermined temperature Tth, a required acceleration Aacc and a required deceleration Abrk requested by the driver are calculated at step 303 from the output signals from the accelerator position sensor 30 and the brake pedal position sensor 32 by a map or the like. The processing of step 303 functions as a driving intention detecting means.

At step 304, thereafter, it is checked whether the required acceleration Aacc is lower than a predetermined acceleration Aath and the required deceleration Abrk is lower than a predetermined deceleration Abth. When the result of the determination reveals that the required acceleration Aacc is equal to or higher than the predetermined acceleration Aath or the required deceleration Abrk is equal to or higher than the predetermined deceleration Abth, the following processing is not carried out. (That is, when the driver requests quick acceleration or quick deceleration beyond a predetermined range, the following processing is not carried out.) Then this routine is terminated. As a result, the temperature rise control is prohibited and the charging/discharging power of the high-voltage battery 12 is controlled so that the driver's acceleration/deceleration request is met.

Meanwhile, when it is determined at step 304 that the required acceleration Aacc is lower than the predetermined acceleration Aath and the required deceleration Abrk is lower than the predetermined deceleration Abth, it is determined that the temperature rise control is permitted. Then the processing of step 305 and the following steps is carried out and command charge/discharge power Pb that attains maximum charge/discharge in the temperature rise control is set. The command power is set by the same processing as that of steps 103 to 107 in the temperature rise control routine in FIG. 2 described in relation to the first embodiment. Then the actuator is controlled according to this command power Pb and the charging/discharging power of the high-voltage battery 12 is controlled so that the command power Pb is attained.

In the fourth embodiment, degree of a driver's acceleration/deceleration request is determined. When the driver requests quick acceleration or quick deceleration beyond a predetermined range, the temperature rise control is prohibited. Thus the driver's acceleration/deceleration request can be met any time, even during the execution of the temperature rise control.

Fifth Embodiment

Even though there is a margin between the actual charging/discharging current and the maximum chargeable/dischargeable current (Ibmin, Ibmax), the high-voltage battery 12 may be overcharged or undercharged depending on the remaining capacity SOC of the high-voltage battery 12 when the temperature rise control is continued.

Figure 9:
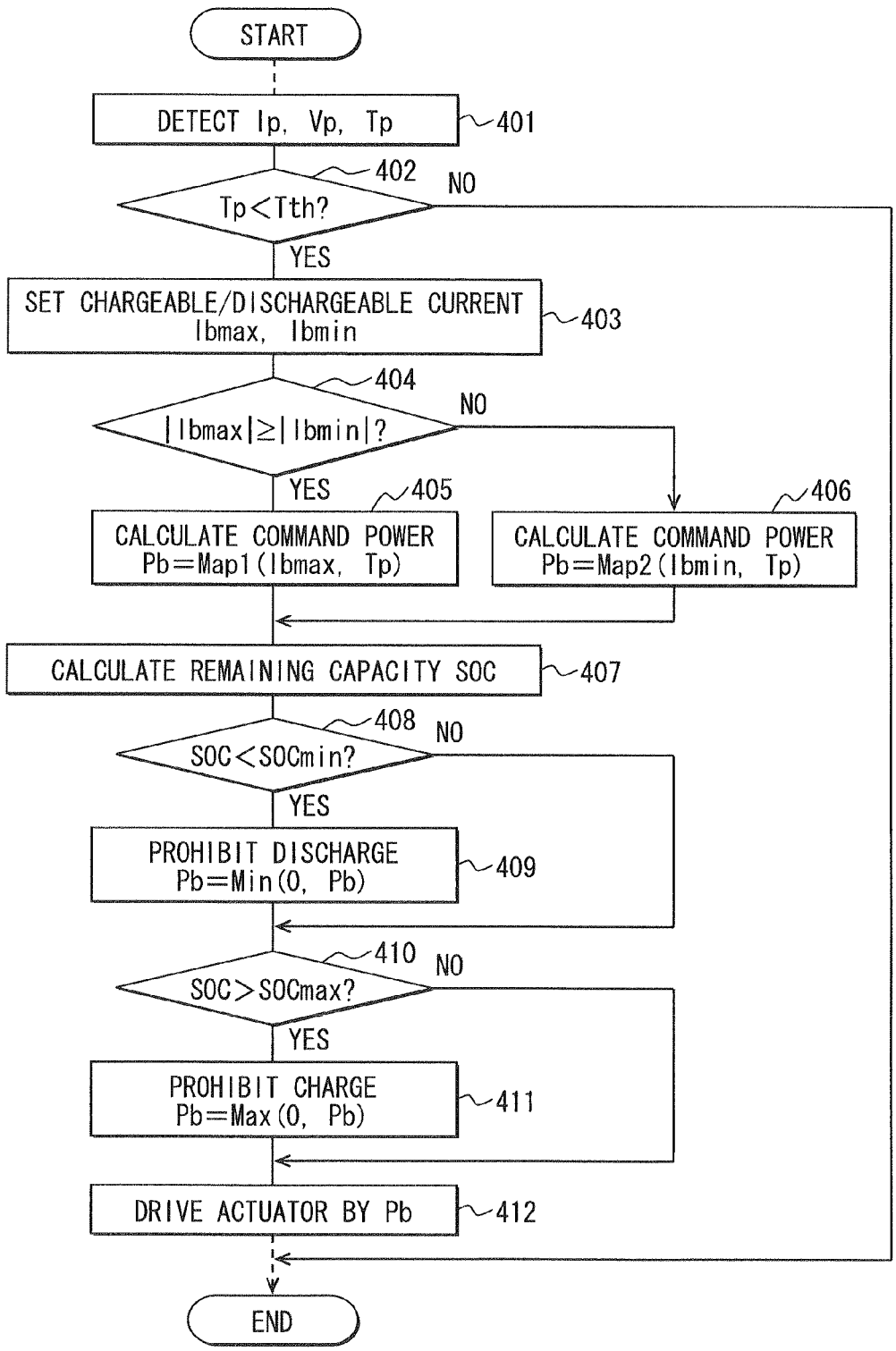
FIG. 9 is a flowchart illustrating the processing in a the temperature rise control routine in a fifth embodiment.

In the fifth embodiment illustrated in FIG. 9, consequently, the remaining capacity SOC of the high-voltage battery 12 is calculated. When the calculated remaining capacity SOC is out of a predetermined normal use range (SOCmin to SOCmax), power control to the direction in which the remaining capacity SOC gets out of the normal use range is prohibited in the temperature rise control.

Figure 2:
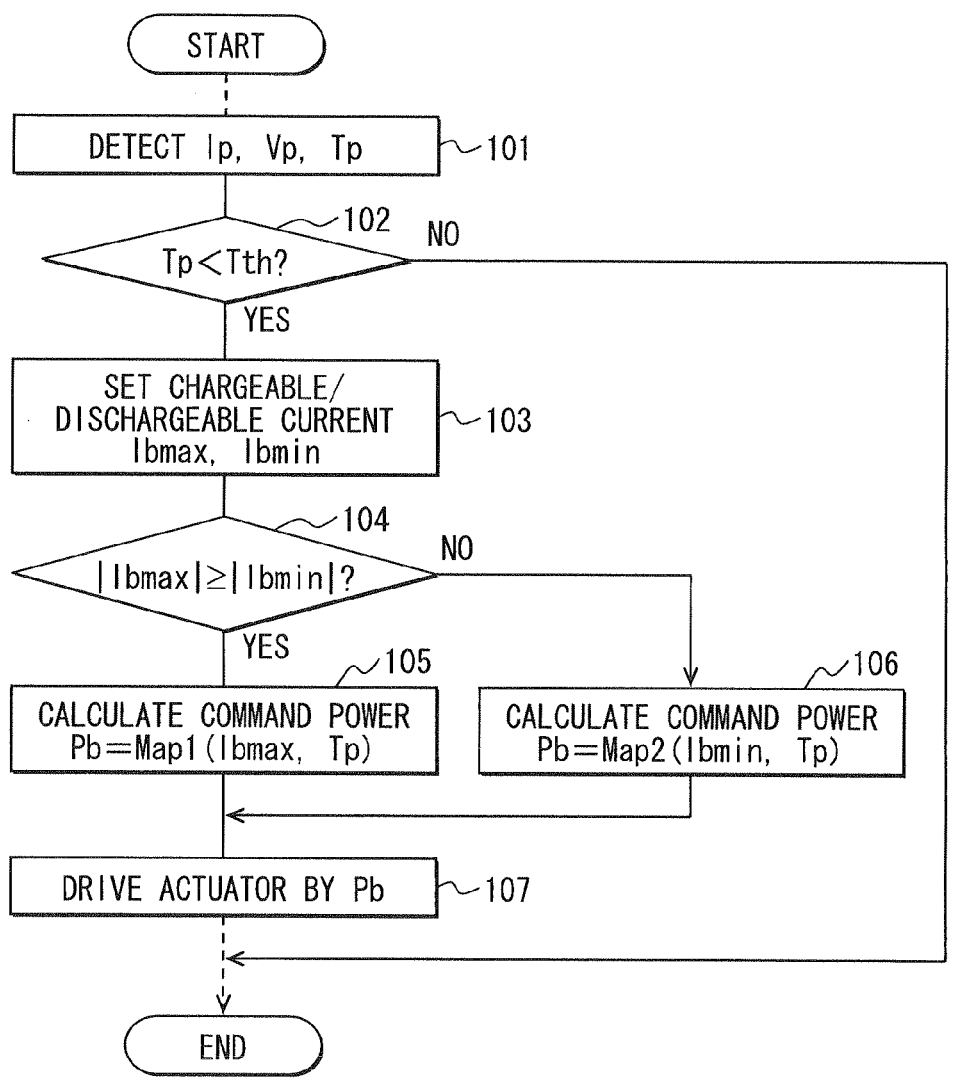
FIG. 2 is a flowchart illustrating the processing in a the temperature rise control routine in the first embodiment.

In the fifth embodiment, the processing of steps 401 to 406 in the temperature rise control routine in FIG. 9 is the same as the processing of steps 101 to 106 in the temperature rise control routine in FIG. 2 described in relation to the first embodiment.

When this routine is started, the processing is carried out as described below. The command charge/discharge power Pb that attains maximum charge/discharge in the temperature rise control is set by the processing of steps 401 to 406. At step 407, thereafter, the remaining capacity SOC of the high-voltage battery 12 is calculated. Any method can be used to calculate the remaining capacity SOC. For example, the charging/discharging current of the high-voltage battery 12 may be integrated and this integration value may be used to calculate the remaining capacity SOC. The processing of step 407 functions as a remaining capacity determining means.

At step 408, thereafter, the present remaining capacity SOC is compared with the lower limit value SOCmin within the normal use range. When the present remaining capacity SOC is lower than the lower limit value SOCmin within the normal use range, discharging is prohibited at step 409 and only charging is permitted. In this case, the following takes place on a case-by-case basis. When the command power Pb that attains maximum discharge in the temperature rise control is charging power (power of a negative value), this command power Pb is used as the ultimate command power. When the command power Pb that attains maximum discharge in the temperature rise control is discharging power (power of a positive value), the ultimate command power Pb is 0.

$$Pb=\text{Min}(0, Pb)$$

When it is determined at step 408 that the present remaining capacity SOC is equal to or higher than the lower limit value SOCmin within the normal use range, the processing of step 409 is not carried out.

At step 410, thereafter, the present remaining capacity SOC is compared with the upper limit value SOCmax within the normal use range. When the present remaining capacity SOC is higher than the upper limit value SOCmax within the normal use range, charging is prohibited at step 411 and only discharging is permitted. In this case, the following takes place on a case-by-case basis. When the command power Pb that attains the maximum discharge in the temperature rise control is discharging power (power of a positive value), this command power Pb is used as the ultimate command power. When the command power Pb that attains maximum discharge in the temperature rise control is charging power (power of a negative value), the ultimate command power Pb is 0.

$$Pb=\text{Max}(0,Pb)$$

When it is determined at step 410 that the present remaining capacity SOC is equal to or lower than the upper limit value SOCmax within the normal use range, the processing of step 411 is not carried out.

At step 412, thereafter, the actuator is controlled according to the command power Pb and the charging/discharging power of the high-voltage battery 12 is controlled so that the command power Pb is attained.

As described above, when the remaining capacity SOC of the high-voltage battery 12 is out of the normal use range (SOCmin to SOCmax) in the temperature rise control, the power control to the direction in which the remaining capacity SOC gets out of the normal use range is prohibited in the temperature rise control. As a result of the above-described control, it is possible to prevent the high-voltage battery 12 from being overcharged or undercharged during the temperature rise control and the life of the high-voltage battery 12 from being shortened by the temperature rise control.

In the fifth embodiment, when the remaining capacity SOC of the high-voltage battery 12 is out of the normal use range (SOCmin to SOCmax) in the temperature rise control, only the power control to the direction in which the remaining capacity SOC gets out of the normal use range is prohibited, and the power control to the direction in which the remaining capacity SOC approaches the normal use range is permitted. This makes it possible to recover the remaining capacity SOC during the execution of the temperature rise control and achieve both the securement of the remaining capacity SOC and the execution of the temperature rise control.

In this embodiment, however, the entire temperature rise control may be prohibited when the remaining capacity SOC of the high-voltage battery 12 is out of the normal use range (SOCmin to SOCmax).

Alternatively, when the remaining capacity SOC is higher than the upper limit value SOCmax within the normal use range in the temperature rise control, the temperature rise control may be carried out only by discharging. When the remaining capacity SOC is lower than the lower limit value SOCmin within the normal use range, the temperature rise control may be carried out only by charging.

Sixth Embodiment

In each of the above embodiments, only either charging or discharging may be continuously carried out during the execution of the temperature rise control. However, when charging or discharging is only continuously carried out for a long time, the polarizing effect of the high-voltage battery 12 is increased and significant voltage change occurs.

As a countermeasure therefor, charging and discharging may be alternately and periodically repeated during the execution of the temperature rise control. However, the charging/discharging switching period and the current amplitude (power amplitude) for achieving optimum temperature rise vary from time to time according to the internal state of the high-voltage battery 12. Such internal state include not only the remaining capacity SOC and the battery temperature but also the internal resistance, production tolerance, deterioration, and the like. However, it has been conventionally impossible to achieve the charging/discharging switching period or amplitude for delivering temperature raising performance to the maximum when the internal state of a battery changes.

Figure 10:
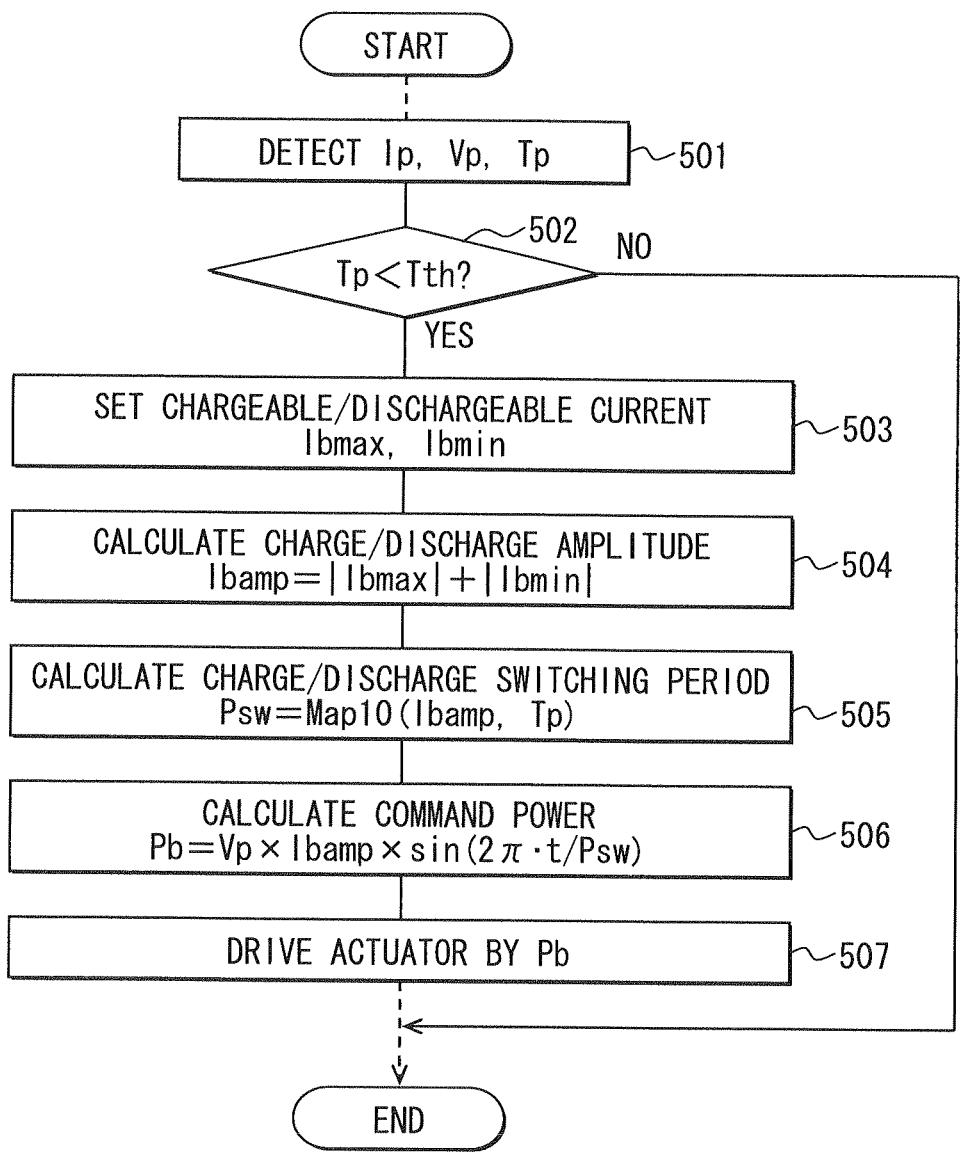
FIG. 10 is a flowchart illustrating the processing in a the temperature rise control routine in a sixth embodiment.

In the sixth embodiment illustrated in FIG. 10, the temperature rise control is carried out by setting the maximum chargeable current Ibmin and the maximum dischargeable current Ibmax by the same method as in the above embodiments. Based on the maximum chargeable current and the maximum dischargeable current, the charging/discharging switching period and amplitude in the temperature rise control are set.

In the sixth embodiment, the processing is carried out as described below. When the temperature rise control routine in FIG. 10 is started, first, the detected current Ip, detected voltage Vp, and detected temperature Tp detected by the respective sensors 24, 25, 26 are retrieved at step 501. At step 502, thereafter, it is checked whether the detected temperature Tp is lower than the predetermined temperature Tth. When the detected temperature Tp is equal to or higher than the predetermined temperature Tth, it is determined that the temperature rise control need not be carried out. Then the following processing is not carried out and this routine is terminated.

When it is determined at step 502 that the detected temperature Tp is lower than the predetermined temperature Tth, the processing of step 503 and the following steps in the temperature rise control is carried out as described below. At step 503, first, the maximum dischargeable current Ibmax and the maximum chargeable current Ibmin are set by a map, a mathematical expression, or the like based on the detected current Ip, detected voltage Vp, and detected temperature Tp. Also in the sixth embodiment, the charging current is expressed as a negative value and the discharging current is expressed as a positive value.

At step 504, thereafter, the absolute value of the maximum dischargeable current Ibmax and the absolute value of the maximum chargeable current Ibmin are added to provide a charging/discharging amplitude Ibamp.

$$Ibamp=|Ibmax|+|Ibmin|$$

At step 505, thereafter, a charging/discharging switching period Psw corresponding to the present charging/discharging amplitude Ibamp and detected temperature Tp is calculated with reference to map data Map10. This map data is used to calculate the charging/discharging switching period Psw using the charging/discharging amplitude Ibamp and the detected temperature Tp as parameters. The map data Map10 may be set beforehand based on experimental data, design data, simulation result, or the like.

At step 506, thereafter, the command power Pb is calculated by the following expression using the charging/discharging amplitude Ibamp, charging/discharging switching period Psw, and detected voltage Vp:

$$Pb=Vp\times Ibamp\times\sin(2\pi\cdot t/Psw)$$

where, t is time that has lapsed after the start of the temperature rise control.

At step 507, thereafter, the actuator (for example, the boost converter 13, inverter 14, motor 11, two-way DC-DC converter 18, or the like) is controlled according to the command power Pb. The charging/discharging power of the high-voltage battery 12 is thereby controlled so that it agrees with the command power Pb. As a result, charging and discharging of the high-voltage battery 12 are repeated with the period Psw between the maximum chargeable current Ibmin and the maximum dischargeable current Ibmax and the temperature of the high-voltage battery 12 is raised.

According to the sixth embodiment, it is possible to set the charging/discharging switching period Psw and the amplitude Ibamp in the temperature rise control, while the maximum chargeable current Ibmin and the maximum dischargeable current Ibmax are varied according to change in the internal state of the high-voltage battery 12 in the temperature rise control. Even when the internal state of the high-voltage battery 12 changes, the charging/discharging switching period Psw and the amplitude Ibamp in the temperature rise control can be controlled to within an appropriate range for the temperature rise control. It is possible to prevent the high-voltage battery 12 from abnormal heating and promptly raise the temperature of the high-voltage battery 12.

In the sixth embodiment, both the charging/discharging switching period Psw and the amplitude Ibamp are set according to the maximum chargeable current Ibmin and the maximum dischargeable current Ibmax. Instead, only either the switching period Psw or the amplitude Ibamp may be set.

Seventh Embodiment

Figure 11:
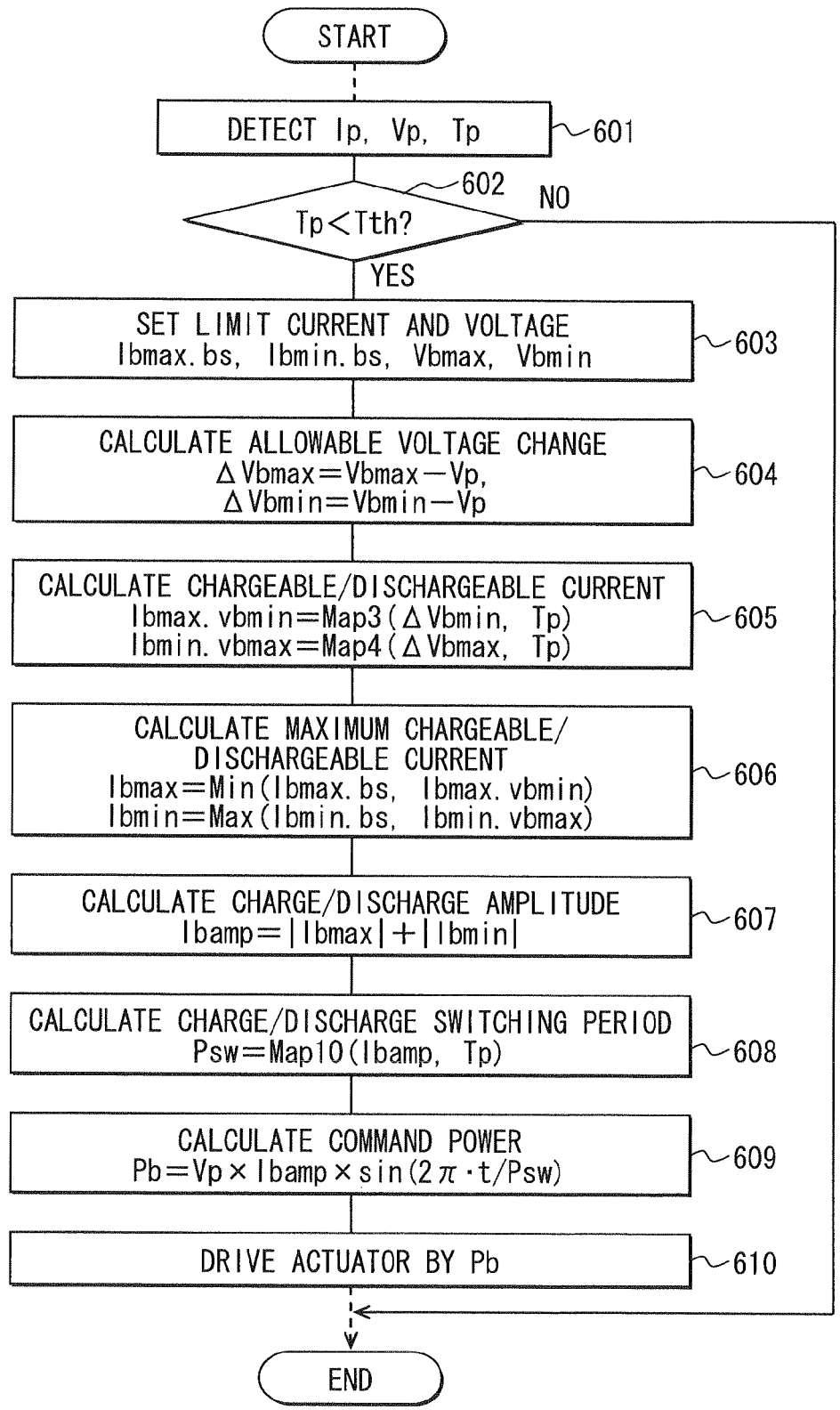
FIG. 11 is a flowchart illustrating the processing in a the temperature rise control routine in a seventh embodiment.

In the seventh embodiment, the processing is carried out as described below. When the temperature rise control routine in FIG. 11 is started, the following processing is carried out at steps 601 to 606. At this time, the same method as at steps 201 to 206 in the temperature rise control routine in FIG. 4 described in relation to the second embodiment is used. The differences between the upper and lower limit values (Vbmax, Vbmin) within the voltage use range of the high-voltage battery 12 and the sampled present voltage Vp are determined. The allowable voltage rise and drop ($\Delta$Vbmax, $\Delta$Vbmin) to the upper and lower limit values (Vbmax, Vbmin) within the voltage use range are calculated from the differences. Then the maximum chargeable current Ibmin and the maximum dischargeable current Ibmax are set using the allowable voltage rise and drop ($\Delta$Vbmax, $\Delta$Vbmin), the battery temperature Tp that has influence on the internal resistance, and the upper and lower limit values (Ibmax, Ibmin) within the current use range of the high-voltage battery 12.

At steps 607 to 610, thereafter, the following processing is carried out by the same method as at steps 504 to 507 in the temperature rise control routine in FIG. 10 described in relation to the sixth embodiment. The absolute value of the maximum dischargeable current Ibmax and the absolute value of the maximum chargeable current Ibmin are added to determine charging/discharging amplitude Ibamp. Further the charging/discharging switching period Psw is calculated from the charging/discharging amplitude Ibamp and the detected temperature Tp. After the command power Pb is calculated form the charging/discharging amplitude Ibamp and the charging/discharging switching period Psw, the actuator is controlled according to the command power Pb and the charging/discharging power of the high-voltage battery 12 is thereby controlled so that it agrees with the command power Pb.

In the seventh embodiment, the same effect as in the second and sixth embodiments can be provided.

Eighth Embodiment

Figure 12:
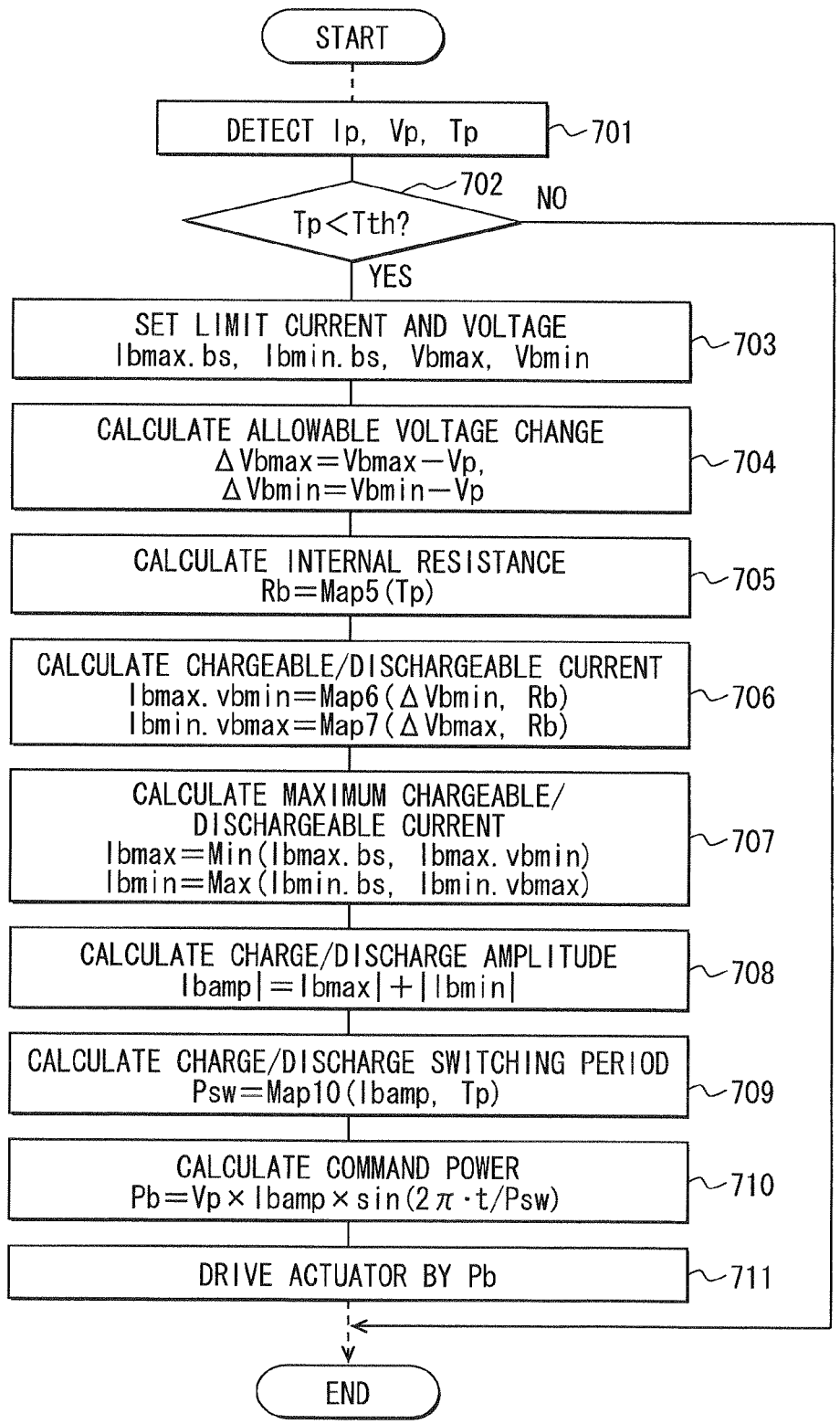
FIG. 12 is a flowchart illustrating the processing in a the temperature rise control routine in an eighth embodiment.

In the eighth embodiment, the processing is carried out as described below. When the temperature rise control routine in FIG. 12 is started, the following processing is carried out at steps 701 to 707. At this time, the same method as at steps 201 to 206 in the temperature rise control routine in FIG. 6 described in relation to the third embodiment is used. The differences between the upper and lower limit values (Vbmax, Vbmin) within the voltage use range of the high-voltage battery 12 and the sampled present voltage Vp are determined. The allowable voltage rise and drop ($\Delta$Vbmax, $\Delta$Vbmin) to the upper and lower limit values (Vbmax, Vbmin) within the voltage use range are calculated from the differences. Then the maximum chargeable current Ibmin and the maximum dischargeable current Ibmax are set based on the allowable voltage rise and drop ($\Delta$Vbmax, $\Delta$Vbmin), the internal resistance Rb estimated based on the battery temperature Tp, and the upper and lower limit values (Ibmax, Ibmin) within the current use range of the high-voltage battery 12.

At steps 708 to 711, thereafter, the following processing is carried out by the same method as at steps 504 to 507 in the temperature rise control routine in FIG. 10 described in relation to the sixth embodiment. The charging/discharging amplitude Ibamp and the charging/discharging switching period Psw are calculated, and the command power Pb is calculated from the calculated charging/discharging amplitude Ibamp and charging/discharging switching period Psw. The actuator is controlled according to this command power Pb and the charging/discharging power of the high-voltage battery 12 is thereby controlled so that the command power Pb is produced.

In the eighth embodiment, the same effect as in the third and sixth embodiments can be obtained.

Ninth Embodiment

In the ninth embodiment, the ECU 20 calculates request torque based on an accelerator position signal from the accelerator position sensor 30, a vehicle speed signal from the vehicle speed sensor 33, and the like. Then the ECU controls the operation of the motor 11 so that this request torque is obtained.

Figure 13:
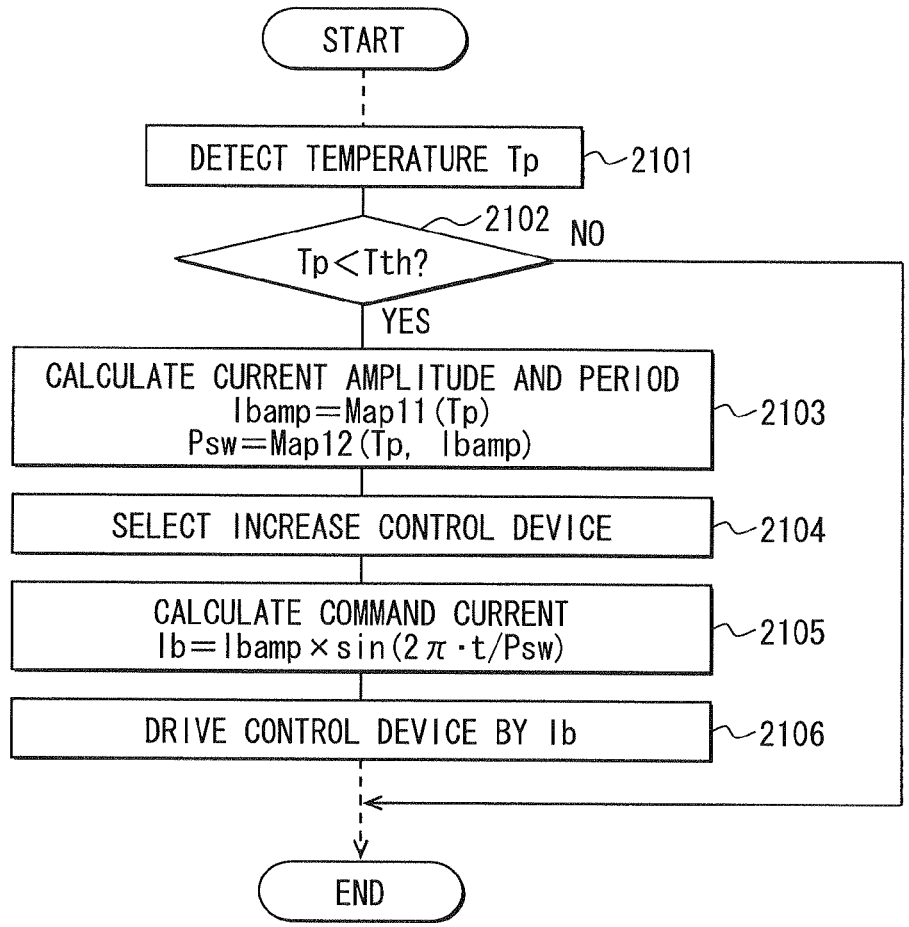
FIG. 13 is a flowchart illustrating the processing in a the temperature rise control routine in a ninth embodiment.

Further, the ECU 20 executes the temperature rise control routine in FIG. 13 and thereby carries out the temperature rise control when the temperature of the high-voltage battery 12 detected by the temperature sensor 26 is lower than the predetermined temperature. In the temperature rise control, charging and discharging of the high-voltage battery 12 are periodically repeated to raise its temperature. It is known that the Joule heat produced within the high-voltage battery 12 during the execution of this the temperature rise control is in proportion to the square of current. Therefore, temperature rise in the high-voltage battery 12 can be accelerated by passing larger current through the high-voltage battery 12 regardless of the direction of current passage (whether charge or discharge).

However, when either charging or discharging is only continuously carried out for a long time during the execution of the temperature rise control, the polarizing effect of the high-voltage battery 12 is increased and significant voltage change occurs. As a countermeasure therefor, it is effective to alternately and periodically repeat charging and discharging during the execution of the temperature rise control. However, the charging/discharging switching period and amplitude for achieving optimum temperature rise vary depending on the internal state of the high-voltage battery 12 that varies from time to time. Such internal state include not only the remaining capacity SOC and the battery temperature but also the internal resistance, production tolerance, deterioration, and the like. Therefore, it is preferable to vary the cycle period and amplitude of charging/discharging for bringing out the maximum temperature rise performance according to the internal state of the high-voltage battery 12. However, the cycle period or amplitude of charging/discharging for achieving optimum temperature rise may be difficult to implement depending on the type of electrical equipment (the two-way DC-DC converter 18, boost converter 13, and motor 11 in this embodiment) used for the temperature rise control.

Therefore, it is preferable to carry out the following processing by the temperature rise control routine in FIG. 13 when the temperature rise control is carried out. Based on the charging/discharging cycle period and amplitude of the high-voltage battery 12, one of electrical equipment most favorable for operating the charging/discharging of the high-voltage battery 12 is selected from among multiple pieces of electrical equipment.

For example, when the two-way DC-DC converter 18 is selected as electrical equipment that carries out the temperature rise control, the step-up operation and step-down operation of the two-way DC-DC converter 18 are periodically switched. Charging and discharging are thereby alternately and periodically switched between the high-voltage battery 12 and the low-voltage battery 17. When the boost converter 13 is selected as the electrical equipment that carries out the temperature rise control, the charging and discharging are alternately and periodically switched between the high-voltage battery 12 and a smoothing capacitor (not shown) of the boost converter 13. When the motor 11 is selected as electrical equipment that carries out the temperature rise control, the operation mode is alternately and periodically switched between a motor mode and a generator mode. In the motor mode, the motor 11 is rotationally driven by discharging power from the high-voltage battery 12. In the generator mode, the motor 11 is operated as a generator and the high-voltage battery 12 is charged.

The temperature rise control routine in FIG. 13 is repeatedly carried out at predetermined time intervals during the period for which the electric power to the ECU 20 is on. When this routine is started, first, the temperature (battery temperature) Tp of the high-voltage battery 12 detected by the temperature sensor 26 is retrieved at step 2101. At step 2102, thereafter, it is checked whether the temperature of the high-voltage battery is within the temperature rise control range based on whether the detected battery temperature Tp is lower than the predetermined temperature Tth. When the battery temperature Tp is equal to or higher than the predetermined temperature Tth, it is determined that the temperature rise control need not be carried out. Then the following processing is not carried out and this routine is terminated.

When it is determined at step 2102 that the battery temperature Tp is lower than the predetermined temperature Tth, the processing of step 2103 and the following steps in the temperature rise control is carried out as described below. At step 2103, first, the amplitude Ibamp of charging/discharging current corresponding to the present battery temperature Tp is calculated with reference to map data Map11. The map data is used to calculate the amplitude Ibamp of charging/discharging current using the battery temperature Tp as a parameter. Then a period Psw corresponding to the present battery temperature Tp and amplitude Ibamp is calculated with reference to map data Map12. This map data is used to calculate the period Psw of charging/discharging current using the battery temperature Tp and the amplitude Ibamp as parameters.

$$Ibamp = Map11(Tp)$$

$$Psw = Map12(Tp, Ibamp)$$

These maps Map11, Map12 are set beforehand based on experimental data, design data, simulation result, or the like.

Figure 14:
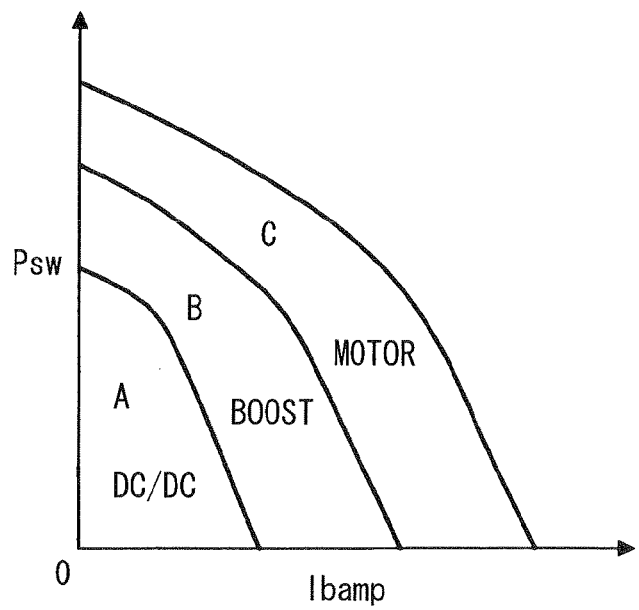
FIG. 14 is a graph illustrating an example of electrical equipment selection map data for the temperature rise control in the ninth embodiment.

At step 2104, thereafter, with reference to the electrical equipment selection map for the temperature rise control in FIG. 14, one of the electrical equipment most favorable for operating the charging/discharging of the high-voltage battery 12 is selected from among three pieces of electrical equipment (two-way DC-DC converter 18, boost converter 13, motor 11) used for the temperature rise control. This selection is made based on the amplitude Ibamp of charging/discharging current and the charging/discharging switching (cycle) period Psw calculated at step 2103. The electrical equipment selection map for the temperature rise control in FIG. 14 may be set beforehand based on experimental data, design data, simulation result, or the like. For example, the map data is so set that, in a range A where the amplitude Ibamp and the period Psw are small, the two-way DC-DC converter 18 is selected. In a range C where the amplitude Ibamp and the period Psw are large, the motor 11 is selected. In a range B between these ranges, the boost converter 13 is selected. The processing of step 2104 functions as a selecting means.

At step 2105, subsequently, the command current Ib is calculated by the following expression using the amplitude Ibamp and switching period Psw of charging/discharging current:

$$Ib = Ibamp \times \sin(2\pi \cdot t / Psw)$$

where, t is the time that has lapsed after the start of the temperature rise control.

At step 2106, thereafter, the electrical equipment selected at step 2104 is controlled according to the command current Ib calculated at step 2105. Charging and discharging of the high-voltage battery 12 are thereby repeated with the period Psw and the amplitude Ibamp and the temperature of the high-voltage battery 12 is raised.

Instead, the command power Pb may be calculated by the following expression using the voltage Vp of the high-voltage battery 12 detected by the voltage sensor 25 in addition to the amplitude Ibamp and switching period Psw of charging/discharging current. The electrical equipment selected at step 2104 is controlled according to this command power Pb. Charging and discharging of the high-voltage battery 12 are thereby repeated with the period Psw and the current amplitude Ibamp and the temperature of the high-voltage battery 12 is raised:

$$Pb = Vp \times Ibamp \times \sin(2\pi \cdot t / Psw)$$

In the ninth embodiment, the temperature rise control is carried out by selecting one of electrical equipment most favorable for operating the charging/discharging of the high-voltage battery 12 from among a plurality of electrical equipment based on the cycle period and amplitude of charging/discharging of the high-voltage battery 12. (Examples of such electrical equipment include the two-way DC-DC converter 18, boost converter 13, and motor 11.) Therefore, it is possible to select electrical equipment capable of achieving the cycle period and amplitude for achieving most favorable temperature rise (or a cycle period and an amplitude closest thereto) from among the plurality of electrical equipment to carry out the temperature rise control. Thus it is possible to enhance the performance of the temperature rise control more than with conventional technologies and achieve quick temperature rise in the high-voltage battery 12.

Tenth Embodiment

When the operation of electrical equipment capable of achieving the cycle period and the amplitude for achieving optimum temperature rise (or a cycle period and an amplitude closest thereto) becomes abnormal, the temperature rise in the high-voltage battery 12 by the temperature rise control is prevented.

In the tenth embodiment, the temperature rise control routine in FIG. 15 is carried out as a countermeasure therefor. That is, the operating state (for example, temperature) of at least one (two-way DC-DC converter 18) of electrical equipment is monitored. When any abnormality in which its performance is limited or stopped is detected, electrical equipment that operates the charging/discharging of the high-voltage battery 12 is selected from among the other of electrical equipment to carry out the temperature rise control.

When the temperature rise control routine in FIG. 15 is started, the processing is carried out as described below. At steps 2201 to 2203, first, the following processing is carried out by, the same method as at steps 2101 to 2103 in the temperature rise control routine in FIG. 13 described in relation to the ninth embodiment. When the battery temperature Tp is lower than the predetermined temperature, it is determined that the temperature of the high-voltage battery is within the temperature rise control range and the amplitude Ibamp and period Psw of charging/discharging current of the high-voltage battery 12 are calculated.

Figure 16A:
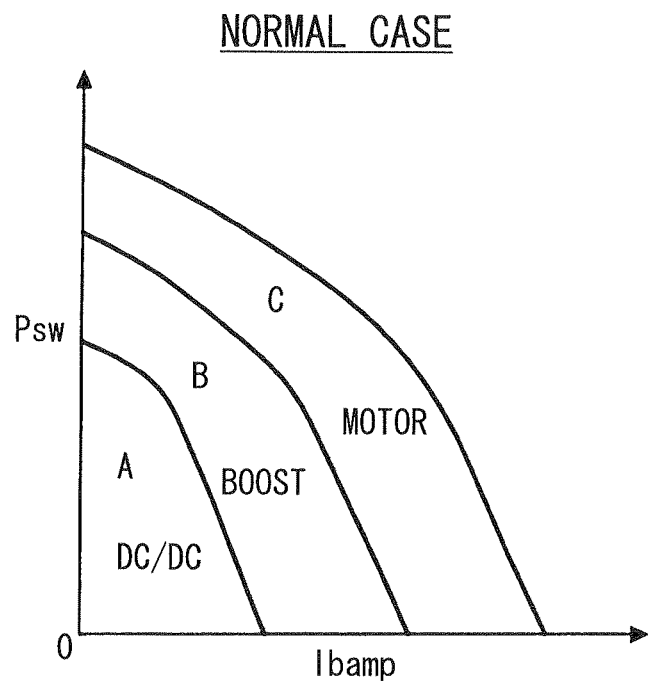
FIG. 16A is a graph illustrating an example of selection map data for a DC-DC converter in a normal case.

At step 2204, thereafter, the temperature Td of the two-way DC-DC converter 18 detected by a temperature sensor (not shown) provided in the two-way DC-DC converter 18 is retrieved. At step 2205, thereafter, the temperature Td of the two-way DC-DC converter 18 is compared with a predetermined abnormality determination temperature Tdth. When it is determined that the temperature Td of the two-way DC-DC converter 18 is lower than the abnormality determination temperature Tdth, it is determined that the two-way DC-DC converter 18 is normally operating. At step 2206, then, the selection map for DC-DC converter normal case in FIG. 16A is referred to. Based on the amplitude Ibamp and period Psw of charging/discharging current calculated at step 2203, one of electrical equipment most favorable for operating the charging/discharging of the high-voltage battery 12 is selected from among three electrical equipment (two-way DC-DC converter 18, boost converter 13, and motor 11) used for the temperature rise control. The selection map for cases where the DC-DC converter is normal in FIG. 16A may be identical with the electrical equipment selection map for the temperature rise control in FIG. 14 used in the ninth embodiment.

Figure 16B:
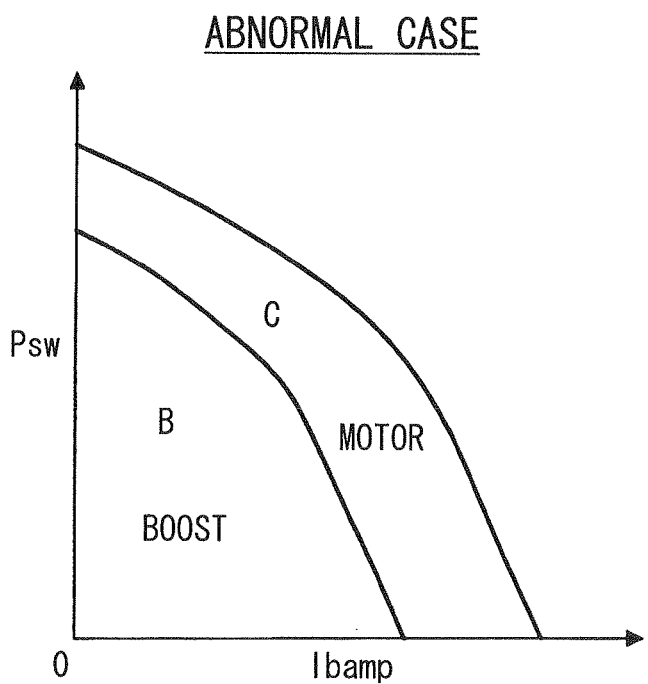
FIG. 16B is a graph illustrating an example of selection map data for the DC-DC converter in an abnormal case.

Meanwhile, when it is determined at step 2205 that the temperature Td of the two-way DC-DC converter 18 is equal to or higher than the abnormality determination temperature Tdth, it is determined that the voltage conversion operation of the two-way DC-DC converter 18 is limited or stopped. At step 2207, the selection map for DC-DC converter abnormal case in FIG. 16B is referred to. Based on the amplitude Ibamp and period Psw of charging/discharging current calculated at step 2203, one of electrical equipment most favorable for operating the charging/discharging of the high-voltage battery 12 is selected from the remaining two electrical equipment (boost converter 13, motor 11) for the temperature rise control other than the two-way DC-DC converter 18. In the selection map for DC-DC converter abnormal case in FIG. 16B, the range where the amplitude Ibamp and the period Psw are small is also set as a range B where the boost converter 13 is selected. When the two-way DC-DC converter 18 is abnormal, therefore, the range B where the boost converter 13 is selected is expanded to the range A where the two-way DC-DC converter 18 is selected when the two-way DC-DC converter 18 is normal. The processing of steps 2204 and 2205 function as an abnormality detecting means and the processing of steps 2205 to 2207 functions as a selecting means.

As described above, the selection map data is changed according to the presence or absence of any abnormality in the two-way DC-DC converter 18 and one of electrical equipment most favorable for operating the charging/discharging of the high-voltage battery 12 is selected. At steps 2208 and 2209, thereafter, the following processing is carried out by the same method as at steps 2105 and 2106 in the temperature rise control routine in FIG. 13 described in relation to the ninth embodiment. A command current Ib is calculated using the amplitude Ibamp and period Psw of charging/discharging current. Thereafter, the electrical equipment selected at step 2206 or 2207 is controlled according to the command current Ib calculated at step 2208. Charging and discharging of the high-voltage battery 12 are thereby repeated with the period Psw and the amplitude Ibamp and the temperature of the high-voltage battery 12 is raised.

In the tenth embodiment, the operating state (for example, temperature) of the two-way DC-DC converter 18 is monitored. When any abnormality in which its performance is limited or stopped is detected, the electrical equipment that operates the charging/discharging of the high-voltage battery 12 is selected from among the other electrical equipment to carry out the temperature rise control. Therefore, even when the operating state of the two-way DC-DC converter 18 becomes abnormal, the temperature rise control can be carried out by selecting electrical equipment that operates the charging/discharging of the high-voltage battery 12 from among the other electrical equipment. Thus it is possible to avoid the prevention of temperature rise in the high-voltage battery 12 by any abnormality in the two-way DC-DC converter 18.

In the tenth embodiment, abnormality in the two-way DC-DC converter 18 is detected. Instead, an abnormality in any other electrical equipment (boost converter 13, motor 11) may be detected or abnormality in two or more electrical equipment may be detected.

In the tenth embodiment, the temperature of electrical equipment for the temperature rise control (the temperature Td of the two-way DC-DC converter 18) is monitored to detect any abnormality. Instead, current or voltage may be monitored to detect any abnormality or two or more items of temperature, current, and voltage may be monitored to detect any abnormality.

In the ninth and tenth embodiments, three electrical equipment are used as electrical equipment for the temperature rise control. Instead, two electrical equipment or four or more electrical equipment may be used.

The electrical equipment for the temperature rise control is not limited to the two-way DC-DC converter 18, boost converter 13, or motor 11. Instead, for example, an alternator, an electric air conditioner, an electric power steering device, a DC-DC converter that carries out voltage conversion only in one way, or the like may be used. In this case, the alternator (generator) and another electrical equipment may be combined together to periodically repeat charging and discharging. Alternatively, only either charging or discharging may be periodically (intermittently) repeated with any one of electrical equipment.

Eleventh Embodiment

Figure 17:
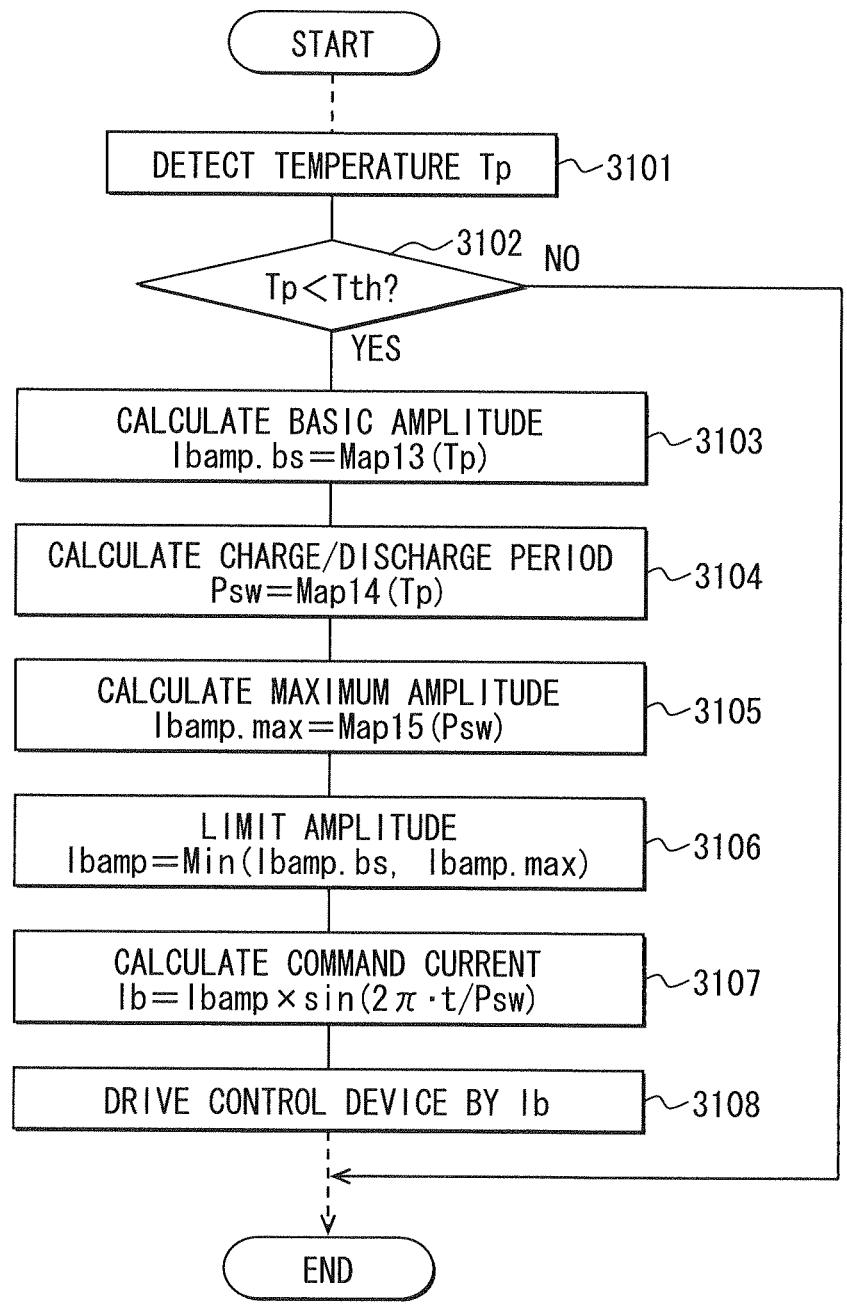
FIG. 17 is a flowchart illustrating a the temperature rise control routine in an eleventh embodiment.

In the eleventh embodiment, the processing is carried out as described below. When the temperature rise control routine in FIG. 17 is started, first, the temperature Tp of the high-voltage battery 12 detected by the temperature sensor 26 is retrieved at step 3101. At step 3102, thereafter, it is checked whether the temperature of the high-voltage battery is within the temperature rise control range based on whether the battery temperature Tp is lower than the predetermined temperature Tth. When the battery temperature Tp is equal to or higher than the predetermined temperature Tth, it is determined that the temperature rise control need not be carried out. Then the following processing is not carried out and this routine is terminated.

When it is determined at step 3102 that the battery temperature Tp is lower than the predetermined temperature Tth, the processing of step 3103 and the following steps in the temperature rise control is carried out as described below. At step 3103, first, an amplitude basic value Ibamp.bs of charging/discharging current corresponding to the present battery temperature Tp is calculated with reference to map data Map13. This map data is used to calculate the amplitude basic value Ibamp.bs of charging/discharging current using the battery temperature Tp as a parameter.

$$Ibamp.bs = Map13(Tp)$$

This amplitude basic value Ibamp.bs is equivalent to amplitude before it is limited by the period Psw of charging/discharging calculated at the next step, step 3104. The map data Map13 may be set beforehand based on experimental data, design data, simulation result, or the like. In addition to the battery temperature Tp, the current and/or voltage of the high-voltage battery 12 may be taken into account to calculate the amplitude basic value Ibamp.bs.

At step 3104, subsequently, the switching period Psw of charging/discharging corresponding to the present battery temperature Tp is calculated with reference to map data Map14, which is used to calculate the period Psw of charging/discharging using the battery temperature Tp as a parameter.

$$Psw = Map14(Tp)$$

This map data Map14 may be set beforehand based on experimental data, design data, simulation result, or the like. In addition to the battery temperature Tp, the current and/or voltage of the high-voltage battery 12 may be taken into account to calculate the period Psw.

Figure 18:
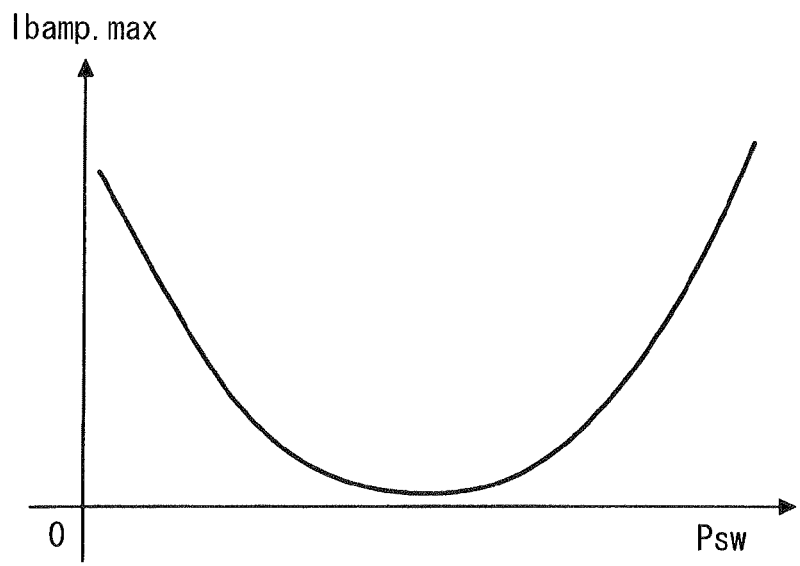
FIG. 18 is a graph conceptually illustrating an example of a map for calculating an amplitude limit value of charging/discharging current based on the cycle of charging/discharging in the eleventh embodiment.

At step 3105, thereafter, an amplitude limit value Ibamp.max of charging/discharging current is calculated based on the period Psw of charging/discharging with reference to map data Map15 in FIG. 18. This amplitude limit value Ibamp.max is set for the reduction of noise, such as vibration noise, due to charging/discharging. When the motor 11 is used as the electrical equipment that carries out the temperature rise control, the amplitude limit value Ibamp.max is set not only for noise reduction. The amplitude limit value is also set to suppress fluctuation in driving force and fluctuation in number of revolutions due to charging/discharging for the enhancement of drivability. The map data Map15 in FIG. 18 may be set beforehand so that the following is implemented based on experimental data, design data, simulation result, or the like. The amplitude limit value Ibamp.max is reduced in a period range (frequency range) where vibration noise and fluctuation in the driving force of and fluctuation in the number of revolutions of the motor 11 due to charging/discharging are prone to occur.

At step 3106, subsequently, the amplitude basic value Ibamp.bs is limited by the amplitude limit value Ibamp.max (guard processing) to determine the ultimate amplitude Ibamp of charging/discharging current. Specifically, the amplitude basic value Ibamp.bs and the amplitude limit value Ibamp.max are compared with each other and the smaller one is taken as the ultimate amplitude Ibamp of charging/discharging current.

$$Ibamp = Min(Ibamp.bs, Ibamp.max)$$

The processing of steps 3105 and 3106 functions as a limiting means.

At step 3107, thereafter, the command current Ib is calculated by the following expression using the amplitude Ibamp and period Psw of charging/discharging current:

$$Ib = Ibamp \times \sin(2\pi \cdot t / Psw)$$

where, t is the time that has lapsed after the start of the temperature rise control.

At step 3108, thereafter, electrical equipment (for example, the boost converter 13, inverter 14, motor 11, two-way DC-DC converter 18, or the like) is controlled according to the command current Ib calculated at step 3107. Charging and discharging of the high-voltage battery 12 are thereby repeated with the period Psw and the amplitude Ibamp and the temperature of the high-voltage battery 12 is raised.

Instead, the temperature of the high-voltage battery 12 may be raised by calculating the command power Pb by the following expression using the voltage Vp of the high-voltage battery 12 detected by the voltage sensor 25, in addition to the amplitude Ibamp and period Psw of charging/discharging current. The electrical equipment is controlled according to this command power Pb and charging and discharging of the high-voltage battery 12 are thereby repeated with the period Psw and the current amplitude Ibamp:

$$Pb = Vp \times Ibamp \times \sin(2\pi \cdot t / Psw)$$

In the eleventh embodiment, the amplitude is reduced based on the cycle period of charging/discharging of the high-voltage battery 12 so that vibration noise is reduced during the execution of the temperature rise control. Therefore, it is possible to reduce noise, such as vibration noise, produced during the execution of the temperature rise control and quickly raise the temperature of the high-voltage battery 12. When the motor 11 is used as the electrical equipment that carries out the temperature rise control, it is possible to reduce not only noise but also fluctuation in driving force and quickly raise the temperature of the high-voltage battery 12 by limiting the amplitude based on the cycle period of charging/discharging.

Twelfth Embodiment

Travel noise such as road noise and wind noise is increased with increase in vehicle speed. For this reason, noise due to the temperature rise control which an occupant can hear in low-speed traveling may be obscured by traveling noise in high-speed traveling and the occupant may be hardly able to hear it. Similarly, it becomes more difficult for occupants to feel fluctuation in driving force due to the temperature rise control with increase in vehicle speed.

Figure 19:
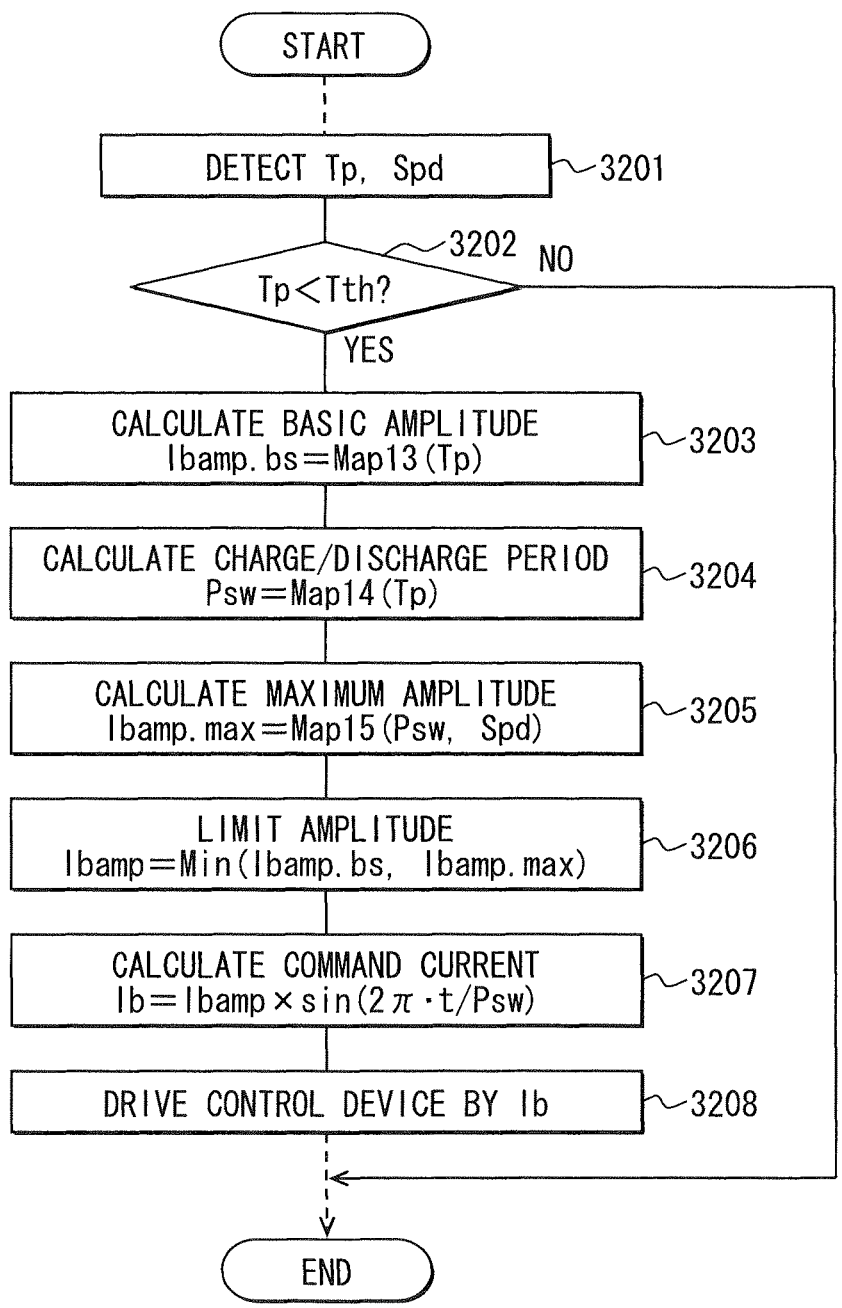
FIG. 19 is a flowchart illustrating a the temperature rise control routine in a twelfth embodiment.

In the twelfth embodiment, the vehicle speed Spd is also taken into account in addition to the cycle period to calculate the amplitude limit value Ibamp.max to limit the amplitude by executing the temperature rise control routine in FIG. 19.

When the temperature rise control routine in FIG. 19 is started, first, the battery temperature Tp detected by the temperature sensor 26 and the vehicle speed Spd detected by the vehicle speed sensor 33 are retrieved at step 3201. At steps 3202 to 3204, thereafter, the following processing is carried out by the same method as at steps 3102 to 3104 in the temperature rise control routine in FIG. 17 described in relation to the eleventh embodiment. When the battery temperature Tp is lower than the predetermined temperature Tth, the amplitude basic value Ibamp.bs and the period Psw corresponding to the battery temperature Tp are calculated.

Figure 20:
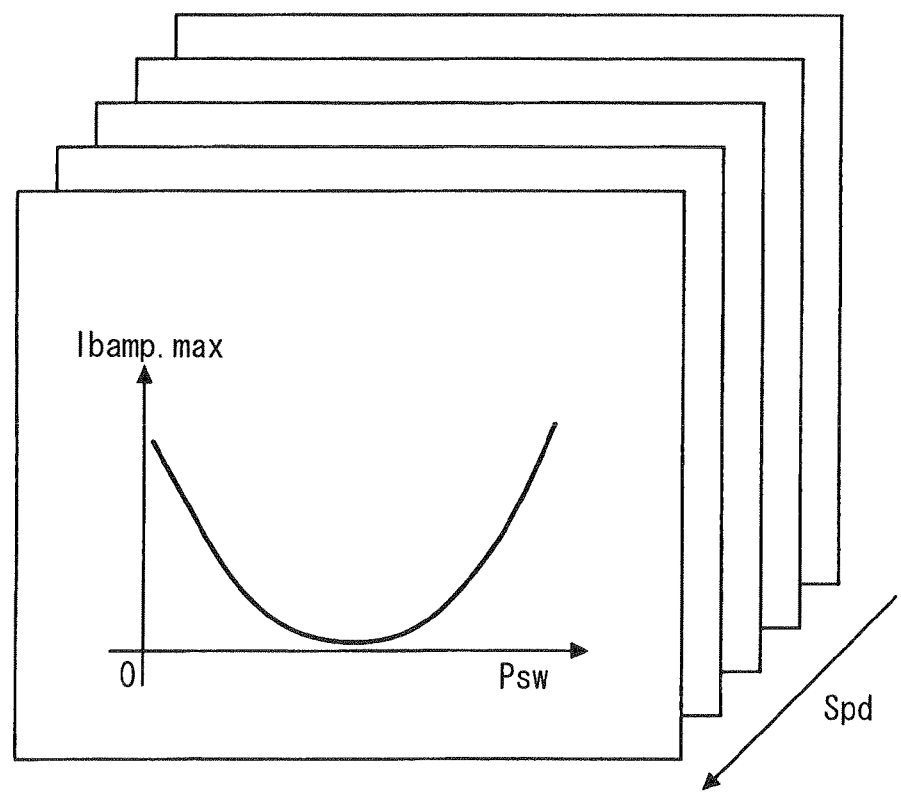
FIG. 20 is a graph illustrating an example of map data for calculating an amplitude limit value of charging/discharging current based on the cycle of charging/discharging and vehicle speed in the twelfth embodiment.

At step 3205, thereafter, the amplitude limit value Ibamp.max of charging/discharging current is calculated based on the period Psw of charging/discharging and the vehicle speed Spd with reference to map data Map15 in FIG. 20. At this time, a data map corresponding to the present vehicle speed Spd may be selected from among a plurality of maps set for each vehicle speed Spd to calculate the amplitude limit value Ibamp.max corresponding to the period Psw. Alternatively, the amplitude limit value Ibamp.max corresponding to the present vehicle speed Spd and period Psw may be calculated using one two-dimensional map used to calculate the amplitude limit value Ibamp.max using the vehicle speed Spd and the period Psw as parameters.

At steps 3206 to 3208, thereafter, the following processing is carried out by the same method as at steps 3106 to 3108 in the temperature rise control routine in FIG. 17 described in relation to the eleventh embodiment. The amplitude basic value Ibamp.bs is limited by the amplitude limit value Ibamp.max (guard processing) to determine the ultimate amplitude Ibamp of charging/discharging current. The electrical equipment is controlled according to the command current Ib calculated using this amplitude Ibamp and the period Psw. Charging and discharging of the high-voltage battery 12 are thereby repeated with the period Psw and the amplitude Ibamp and the temperature of the high-voltage battery 12 is raised.

According to the twelfth embodiment, in addition to the period of charging/discharging, vehicle speed is also taken into account to calculate the amplitude limit value Ibamp.max and limit the amplitude. Therefore, the limitation of amplitude can be mitigated in correspondence to the phenomenon that it becomes more difficult for an occupant to recognize vibration noise or fluctuation in driving force due to the temperature rise control with increase in vehicle speed. It is possible to avoid excessively limiting the amplitude in high-speed traveling and to minimize degradation in temperature rise performance due to the limitation of amplitude.

Thirteenth Embodiment

When a driver operates the accelerator pedal 29 to quickly accelerate during the execution of the temperature rise control, it is preferable to give higher priority to meeting the driver's acceleration request than to reducing noise or driving force fluctuation.

Figure 21:
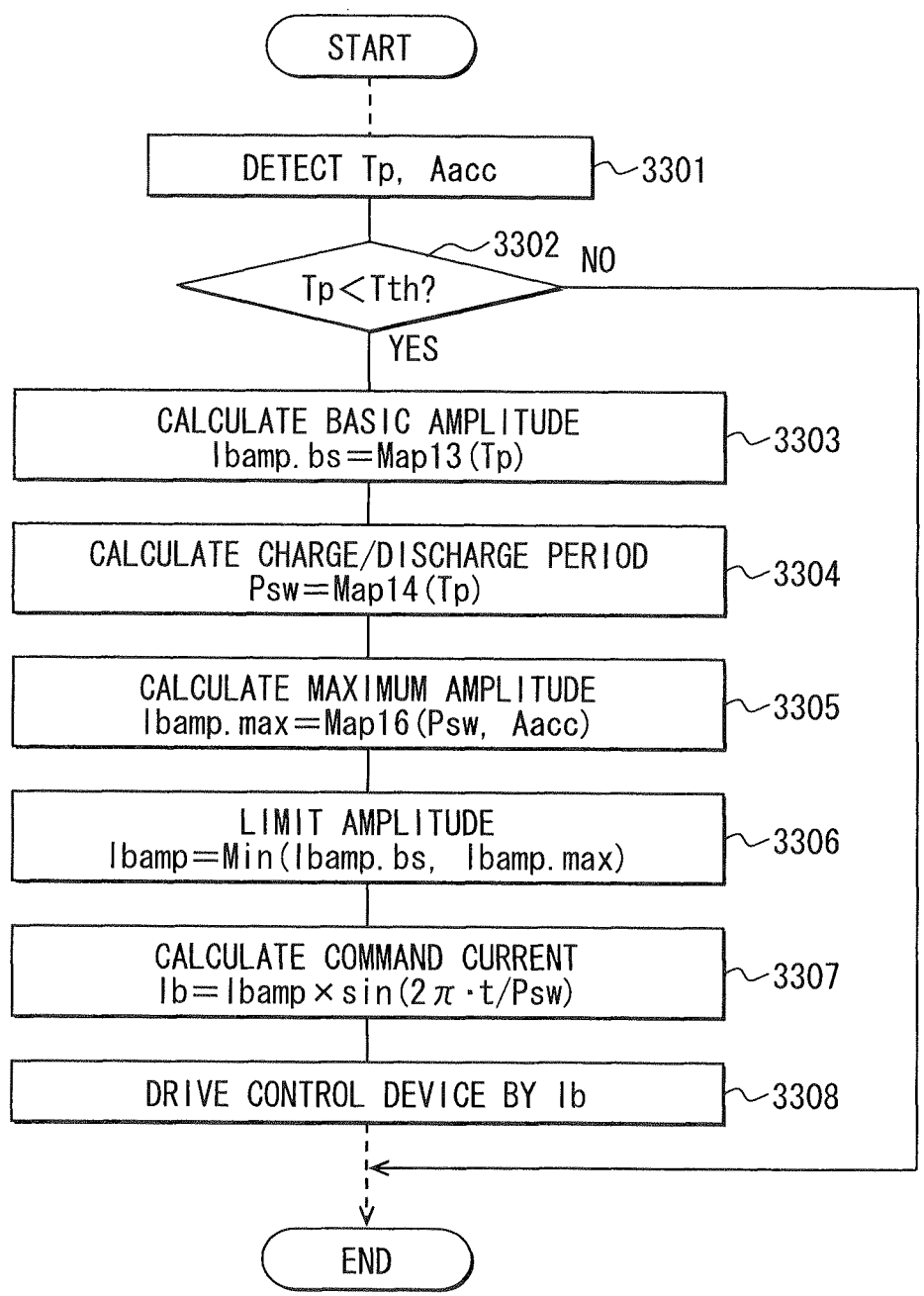
FIG. 21 is a flowchart illustrating a the temperature rise control routine in a thirteenth embodiment.

In the thirteenth embodiment, by executing the temperature rise control routine in FIG. 21, the accelerator pedal depression amount is also taken into account in addition to the cycle period to calculate the amplitude limit value Ibamp.max to limit the amplitude.

When the temperature rise control routine in FIG. 21 is started, first, the battery temperature Tp detected by the temperature sensor 26 and the accelerator pedal depression amount Aacc detected by the accelerator position sensor 30 are retrieved at step 3301. At steps 3302 to 3304, thereafter, the following processing is carried out by the same method as at steps 3102 to 3104 in the temperature rise control routine in FIG. 17 described in relation to the eleventh embodiment. When the battery temperature Tp is lower than the predetermined temperature Tth, the amplitude basic value Ibamp.bs and the period Psw corresponding to the battery temperature Tp are calculated.

Figure 22:
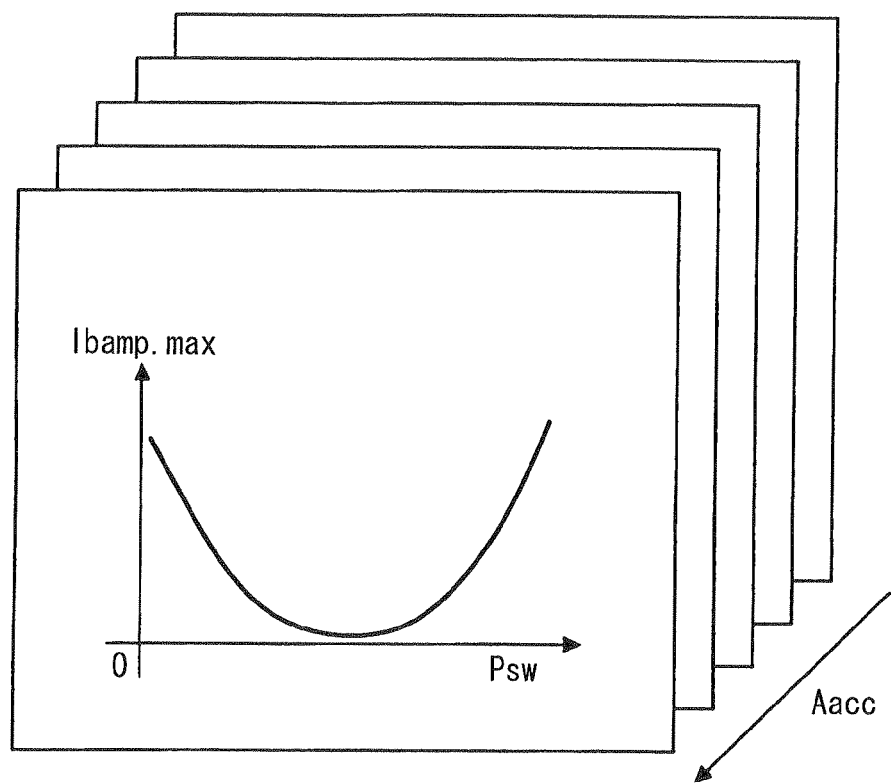
FIG. 22 is a graph illustrating an example of map data for calculating an amplitude limit value of charging/discharging current based on the cycle of charging/discharging and an accelerator pedal depression amount in the thirteenth embodiment.

At step 3305, thereafter, the amplitude limit value Ibamp.max of charging/discharging current is calculated based on the period Psw of charging/discharging and the accelerator pedal depression amount Aacc with reference to map data Map16 in FIG. 22. At this time, a map corresponding to the present accelerator pedal depression amount Aacc is selected from among a plurality of maps set for each accelerator pedal depression amount Aacc to calculate the amplitude limit value Ibamp.max corresponding to the period Psw. Alternatively, the amplitude limit value Ibamp.max corresponding to the present accelerator pedal depression amount Aacc and period Psw may be calculated using one two-dimensional map. This two-dimensional map data is used to calculate the amplitude limit value Ibamp.max using the accelerator pedal depression amount Aacc and the period Psw as parameters.

At steps 3306 to 3308, thereafter, the following processing is carried out by the same method as at steps 3106 to 3108 in the temperature rise control routine in FIG. 17 described in relation to the eleventh embodiment. The amplitude basic value Ibamp.bs is limited by the amplitude limit value Ibamp.max (guard processing) to determine the ultimate amplitude Ibamp of charging/discharging current. The electrical equipment is controlled according to the command current Ib calculated using this amplitude Ibamp and the period Psw. Charging and discharging of the high-voltage battery 12 are thereby repeated with the period Psw and the amplitude Ibamp and the temperature of the high-voltage battery 12 is raised.

According to the thirteenth embodiment, in addition to the period of charging/discharging, the accelerator pedal depression amount is also taken into account to calculate the amplitude limit value Ibamp.max and limit the amplitude. Therefore, when a driver operates the accelerator pedal 29 to quickly accelerate during the execution of the temperature rise control, it is possible to mitigate the limitation of amplitude so that the driver's acceleration request is met. It is possible to meet the driver's acceleration request and further accelerate temperature rise in the high-voltage battery 12 any time during the execution of the temperature rise control.

Further, when a driver operates the brake pedal 31 to quickly decelerate during the execution of the temperature rise control, the limitation of amplitude may be mitigated according to the operation amount of the brake pedal 31 so that the driver's deceleration request is met. It is essential only that amplitude limiting conditions are varied with the driver's driving intention taken into account.

In any of the eleventh embodiment to the thirteenth embodiment, the amplitude is limited based on the period of charging/discharging set according to the temperature of the high-voltage battery 12 during the execution of the temperature rise control. Conversely, the period may be limited based on the amplitude of charging/discharging set according to the temperature, current, voltage, or the like of the high-voltage battery 12 during the execution of the temperature rise control. As described above, it is possible to limit the period by limiting the period based on the amplitude so that a range where the oscillation amplitude is large does not enter an audible frequency range or a low-frequency range where fluctuation in driving force can be easily recognized. Therefore, the same effect can be obtained. Needless to add, both the period and amplitude of charging/discharging may be limited so that vibration noise and fluctuation in driving force are reduced.

The electrical equipment for the temperature rise control is not limited to the two-way DC-DC converter 18, boost converter 13, or motor 11. Instead, for example, an alternator, an electric air conditioner, an electric power steering device, a DC-DC converter that carries out voltage conversion only in one way, or the like may be used. In this case, the alternator (generator) and another electrical equipment may be combined together to periodically repeat charging and discharging. Only one of charging and discharging may be periodically (intermittently) repeated with any one of electrical equipment.

Each of the above embodiments is not limited to the temperature rise control in the high-voltage battery 12 and may be applied to the temperature rise control in the low-voltage battery 17.

Each of the above embodiments is not limited to an electric vehicle and may be applied to and realized in a hybrid electric vehicle using both a motor and an engine as driving sources. Further, each of the above embodiments can also be applied to and realized in the temperature rise control in a battery mounted in a vehicle using only an engine as a driving source.

What is claimed is:

1. A battery temperature control system that carries out temperature rise control to raise temperature of a battery mounted in a vehicle by periodically repeating charging and/or discharging of the battery, the battery temperature control system comprising:
   limiting means for limiting at least either of a cycle period or an amplitude of charging and/or discharging of the battery so that vibration noise and/or driving force fluctuation is reduced during execution of the temperature rise control; and
   vehicle speed detecting means for detecting vehicle speed,
   wherein the limiting means limits at least either the cycle period or the amplitude in accordance with the vehicle speed detected by the vehicle speed detecting means;
   wherein a limitation value of the at least either the cycle period or the amplitude is mitigated with an increase in the vehicle speed; and
   wherein the limiting means limits the amplitude based on both the cycle period and the vehicle speed.

2. The battery temperature control system of claim 1, further comprising: driving intention detecting means for detecting driver's driving intention, wherein the limiting means limits at least either the cycle period or the amplitude in accordance with the driver's driving intention detected by the driving intention detecting means.

3. A battery temperature control system that carries out temperature rise control to raise temperature of a battery mounted in a vehicle by periodically repeating charging or discharging of the battery, the battery temperature control system comprising:
   a processing system, including a processor, configured to limit at least either a cycle period or an amplitude of the charging or discharging of the battery so that vibration noise or driving force fluctuation is reduced during execution of the temperature rise control; and
   a vehicle speed detector configured to detect a vehicle speed;
   wherein the processing system is configured to limit said at least either the cycle period or the amplitude in accordance with the vehicle speed detected by the vehicle speed detector;
   wherein a limitation value of said at least either the cycle period or the amplitude is mitigated with an increase in the vehicle speed; and
   wherein the processing system is configured to limit the amplitude based on both the cycle period and the vehicle speed.

4. The battery temperature control system of claim 3, further comprising: a driving intention detector configured to detect a driver's driving intention, wherein the processing system is configured to limit said at least the cycle period or the amplitude in accordance with the driver's driving intention detected by the driving intention detector.

* * * * *